US011354583B2

(12) United States Patent
Azizsoltani et al.

(10) Patent No.: US 11,354,583 B2
(45) Date of Patent: Jun. 7, 2022

(54) AUTOMATICALLY GENERATING RULES FOR EVENT DETECTION SYSTEMS

(71) Applicant: SAS Institute Inc., Cary, NC (US)

(72) Inventors: Hamoon Azizsoltani, Raleigh, NC (US); Prathaban Mookiah, San Diego, CA (US); Weichen Wang, Cary, NC (US); Thomas J. O'Connell, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/225,238

(22) Filed: Apr. 8, 2021

(65) Prior Publication Data

US 2022/0121967 A1     Apr. 21, 2022

Related U.S. Application Data

(60) Provisional application No. 63/122,370, filed on Dec. 7, 2020, provisional application No. 63/092,463, filed on Oct. 15, 2020.

(51) Int. Cl.
    *G06N 5/02*     (2006.01)
    *G06N 5/00*     (2006.01)
    (Continued)

(52) U.S. Cl.
    CPC ......... *G06N 5/025* (2013.01); *G06F 11/3409* (2013.01); *G06F 11/3476* (2013.01);
    (Continued)

(58) Field of Classification Search
    CPC .................................................. G06N 5/025
    (Continued)

(56) References Cited

U.S. PATENT DOCUMENTS 6,226,627 B1 * 5/2001 Polak ................. G06N 20/00
                                                      706/14
6,519,580 B1 * 2/2003 Johnson ............. G06K 9/6282
                                                      706/47
(Continued)

FOREIGN PATENT DOCUMENTS

WO       2008141168 A1     11/2008

OTHER PUBLICATIONS

Bonchi, Francesco, et al. "A classification-based methodology for planning audit strategies in fraud detection." Proceedings of the fifth ACM SIGKDD international conference on Knowledge discovery and data mining. 1999. (Year: 1999).*

(Continued)

*Primary Examiner* — James D. Rutten
(74) *Attorney, Agent, or Firm* — Kilpatrick Townsend & Stockton LLP

(57) ABSTRACT

Logical rules can be automatically generated for use with event detection systems according to some aspects of the present disclosure. For example, a computing device can extract a group of logical rules from trained decision trees and apply a test data set to the group of logical rules to determine count values corresponding to the logical rules. The computing device can then determine performance metric values based on the count values, select a subset of logical rules from among the group of logical rules based on the performance metric values, and provide at least one logical rule in the subset for use with an event detection system. The event detection system can be configured to detect an event in relation to a target data set that was not used to train the decision trees.

30 Claims, 21 Drawing Sheets

(51) Int. Cl.
*G06F 11/34* (2006.01)
*G06F 11/36* (2006.01)
*G06K 9/62* (2022.01)

(52) U.S. Cl.
CPC ........ *G06F 11/3684* (2013.01); *G06K 9/6215* (2013.01); *G06K 9/6256* (2013.01); *G06N 5/003* (2013.01); *G06F 2201/86* (2013.01)

(58) Field of Classification Search
USPC .......................................................... 706/47
See application file for complete search history.

(56) References Cited

U.S. PATENT DOCUMENTS

| | | | | |
|---|---|---|---|---|
| 6,725,287 | B1 * | 4/2004 | Loeb ...................... | G06N 5/025 710/8 |
| 2003/0220860 | A1 * | 11/2003 | Heytens .............. | G06Q 30/0201 705/35 |
| 2007/0005542 | A1 * | 1/2007 | Echeverria ............... | G06N 5/02 706/47 |
| 2008/0037520 | A1 * | 2/2008 | Stein ................... | H04M 7/0069 370/352 |
| 2008/0109392 | A1 * | 5/2008 | Nandy ................... | G06N 5/027 706/47 |
| 2009/0006282 | A1 * | 1/2009 | Roth ...................... | G06N 5/022 706/12 |
| 2009/0094324 | A1 * | 4/2009 | Le Chevalier ........ | G06F 16/958 709/203 |
| 2011/0178624 | A1 * | 7/2011 | Baseman ............... | G06N 5/025 700/104 |
| 2013/0346346 | A1 * | 12/2013 | Criminisi ............... | G06N 7/005 706/12 |
| 2016/0071016 | A1 * | 3/2016 | Goyal ..................... | G06N 5/045 706/47 |
| 2016/0283862 | A1 * | 9/2016 | Urmanov ............. | G06K 9/6215 |
| 2017/0221075 | A1 * | 8/2017 | Wang ................. | G06Q 30/0185 |
| 2018/0046939 | A1 * | 2/2018 | Meron ................. | G06Q 20/405 |
| 2018/0082208 | A1 * | 3/2018 | Cormier ................ | G06N 20/00 |
| 2018/0107695 | A1 * | 4/2018 | Yang ................... | G06F 16/2282 |
| 2019/0152011 | A1 * | 5/2019 | Kummari ............. | B23Q 17/098 |
| 2020/0104200 | A1 * | 4/2020 | Kocberber ............ | G06F 11/008 |
| 2020/0242417 | A1 * | 7/2020 | Sagi ..................... | G06K 9/6267 |
| 2020/0356881 | A1 * | 11/2020 | Bastani .................. | G06N 20/20 |

OTHER PUBLICATIONS

Wang Hui, Wang Jing and Zheng Tao, "Analysis of decision tree classification algorithm based on attribute reduction and application in criminal behavior," 2011 3rd International Conference on Computer Research and Development, 2011, pp. 27-30, doi: 10.1109/ICCRD.2011.5763966. (Year: 2011).*
S. Pathak, I. Mishra and A. Swetapadma, "An Assessment of Decision Tree based Classification and Regression Algorithms," 2018 3rd International Conference on Inventive Computation Technologies (ICICT), 2018, pp. 92-95, doi: 10.1109/ICICT43934.2018.9034296. (Year: 2018).*
Abdelhalim, "A New Method for Learning Decision Trees from Rules and its Illustration for Online Identity Applicatoin Fraud Detection", 152 pages (2000).
Adedoyin, "Predicting Fraud in Mobile Money Transfer", 203 pages (2018).
Albougha, "Comparing Data Mining Classification Algorithms in Detection of Simbox Fraud", 55 pages (2016).
Arbab et al., "Generating Expert Rules from Examples in Prolog", pp. 289-304.
Bhowmik, "Data Mining Techniques in Fraud Detection", Journal of Digital Forensics, Security and Law, vol. 3, No. 2, 21 pages (2008).
Detecting Financial Fraud at Scale with Decision Trees and MLflow on Databricks, 21 pages (2019).
Li et al., "A survey on statistical methods for health care fraud detection", Health Care Manage Sci, 13 pages (2007).
Liu et al., "Healthcare fraud detection: A survey and a clustering model incorporating Geo-location information", 29th World Continuous Auditing and Reporting Symposium (29WCARS), 10 pages (2013).
Lucas, "Credit card fraud detection using machine learning with integration of contextual knowledge", Artificial Intelligence, 148 pages (2019).
Mukherjee et al., "Fraud Analytics Using Data Mining", International Journal of Research Studies in Computer Science and Engineering (IJRSCSE), vol. 3, No. 4, pp. 1-11 (2016).
Phua et al., "A Comprehensive Survey of Data Mining-based Fraud Detection Research", 14 pages.
Quinlan, "Generating Production Rules from Decision Trees", Knowledge Acquisition, pp. 304-307.
Williams, "Inducing and Combining Decision Structures for Expert Systems", 183 pages (1990).
Zareapoor, "Analysis of Credit Card Fraud Detection Techniques: based on Certain Design Criteria", International Journal of Computer Applications, vol. 52, No. 3, pp. 35-42 (2012).

* cited by examiner

| Sample | Tree₁ | Tree₂ | Tree₃ | Target |
|---|---|---|---|---|
| Sample₁ | R₃T₁ | R₄T₂ | R₆T₃ | 0 |
| Sample₂ | R₇T₁ | R₅T₂ | R₅T₃ | 0 |
| Sample₃ | R₂T₁ | R₆T₂ | R₈T₃ | 0 |
| Sample₄ | R₁T₁ | R₆T₂ | R₉T₃ | 0 |
| Sample₅ | R₆T₁ | R₄T₂ | R₉T₃ | 0 |
| Sample₆ | R₃T₁ | R₄T₂ | R₆T₃ | 0 |
| Sample₇ | R₆T₁ | R₃T₂ | R₆T₃ | 1 |
| Sample₈ | R₇T₁ | R₆T₂ | R₉T₃ | 0 |
| Sample₉ | R₇T₁ | R₆T₂ | R₅T₃ | 1 |
| Sample₁₀ | R₇T₁ | R₂T₂ | R₂T₃ | 1 |
| Sample₁₁ | R₂T₁ | R₃T₂ | R₅T₃ | 0 |
| Sample₁₂ | R₄T₁ | R₁T₂ | R₉T₃ | 0 |
| Sample₁₃ | R₄T₁ | R₃T₂ | R₇T₃ | 0 |
| Sample₁₄ | R₅T₁ | R₂T₂ | R₃T₃ | 1 |
| Sample₁₅ | R₇T₁ | R₃T₂ | R₃T₃ | 1 |
| Sample₁₆ | R₃T₁ | R₆T₂ | R₉T₃ | 0 |
| Sample₁₇ | R₅T₁ | R₁T₂ | R₃T₃ | 0 |
| Sample₁₈ | R₁T₁ | R₃T₂ | R₈T₃ | 0 |
| Sample₁₉ | R₅T₁ | R₃T₂ | R₅T₃ | 1 |
| Sample₂₀ | R₁T₁ | R₃T₂ | R₈T₃ | 0 |

FIG. 15

| Sample | Tree$_1$ | Tree$_2$ | Tree$_3$ | Target | RSR |
|---|---|---|---|---|---|
| Sample$_1$ | | | | 0 | null |
| Sample$_2$ | R$_7$T$_1$ | | R$_5$T$_3$ | 0 | R$_7$T$_1$ |
| Sample$_3$ | | | | 0 | null |
| Sample$_4$ | | | | 0 | null |
| Sample$_5$ | | | | 0 | null |
| Sample$_6$ | | | | 0 | null |
| Sample$_7$ | | R$_3$T$_2$ | | 1 | R$_3$T$_2$ |
| Sample$_8$ | R$_7$T$_1$ | | | 0 | R$_7$T$_1$ |
| Sample$_9$ | R$_7$T$_1$ | | R$_5$T$_3$ | 1 | R$_5$T$_3$ |
| Sample$_{10}$ | R$_7$T$_1$ | R$_2$T$_2$ | | 1 | R$_7$T$_1$ |
| Sample$_{11}$ | | R$_3$T$_2$ | R$_5$T$_3$ | 0 | R$_5$T$_3$ |
| Sample$_{12}$ | | | | 0 | null |
| Sample$_{13}$ | | R$_3$T$_2$ | | 0 | R$_3$T$_2$ |
| Sample$_{14}$ | R$_5$T$_1$ | R$_2$T$_2$ | R$_3$T$_3$ | 1 | R$_5$T$_1$ |
| Sample$_{15}$ | R$_7$T$_1$ | R$_3$T$_2$ | R$_3$T$_3$ | 1 | R$_3$T$_3$ |
| Sample$_{16}$ | | | | 0 | null |
| Sample$_{17}$ | R$_5$T$_1$ | | R$_3$T$_3$ | 0 | R$_5$T$_1$ |
| Sample$_{18}$ | | R$_3$T$_2$ | | 0 | R$_3$T$_2$ |
| Sample$_{19}$ | R$_5$T$_1$ | R$_3$T$_2$ | R$_5$T$_3$ | 1 | R$_5$T$_1$ |
| Sample$_{20}$ | | R$_3$T$_2$ | | 0 | R$_3$T$_2$ |

FIG. 16

| Type | Key (keys) | Data (values) |
|---|---|---|
| Population scope | UCM_POS | POS entry mode |
| Raw feature | transaction_amount | transaction amount |
| Derived interval feature | d_i_ratio_avg_amunts_1w_1y | ratio of average transaction amount for the past 1 week vs 1 year |
| Raw feature | HCT_MER_MCC | Merchant MCC code |
| Derived nominal feature | d_n_transaction_is_foreign | foreign country transaction |
| Derived interval feature | d_i_domestic_1y | number of non foreign transactions in past year |
| Description of SAS operators | >= | more than or equal to |
| Description of SAS operators | <= | less than or equal to |
| Description of SAS operators | < | less than |
| Description of SAS operators | > | more than |
| Description of SAS operators | = | equal to |
| Description of SAS operators | ^= | not equal to |
| Detailed Description of nominal value | UCM_POS, "81" | Internet/Ecommerce, No Security or Unable to determine security level transaction |
| Detailed Description of nominal value | UCM_POS, "8E" | Internet/Ecommerce (3D Secure) transaction |
| Detailed Description of nominal value | UCM_POS, "8F" | Internet/Ecommerce (Channel Encrypted) transaction |
| Detailed Description of nominal value | HCT_MER_MCC, 5499 | Convenience Stores and Specialty Markets |
| Detailed Description of nominal value | HCT_MER_MCC, 7278 | Shopping Services |
| Detailed Description of nominal value | HCT_MER_MCC, 5814 | Fast Food Restaurants |

FIG. 19

Rule1: If POS entry mode in ("Internet/Ecommerce, No Security or Unable to determine security level transaction", "Internet/Ecommerce (3D Secure) transaction", "Internet/Ecommerce (Channel Encrypted) transaction") and transaction amount more than or equal to 100 and ratio of average transaction amount for the past 1 week vs 1 year less than or equal to 0.2 then do ...

Rule2: If POS entry mode in ("Internet/Ecommerce, No Security or Unable to determine security level transaction", "Internet/Ecommerce (3D Secure) transaction", "Internet/Ecommerce (Channel Encrypted) transaction") and transaction amount more than or equal to 100 and ratio of average transaction amount for the past 1 week vs 1 year more than 0.2 then do ...

Rule3: If POS entry mode in ("Internet/Ecommerce, No Security or Unable to determine security level transaction", "Internet/Ecommerce (3D Secure) transaction", "Internet/Ecommerce (Channel Encrypted) transaction") and transaction amount less than 100 and Merchant MCC code in ("Convenience Stores and Specialty Markets", "Shopping Services", "Fast Food Restaurants") then do ...

Rule4: If POS entry mode in ("Internet/Ecommerce, No Security or Unable to determine security level transaction", "Internet/Ecommerce (3D Secure) transaction", "Internet/Ecommerce (Channel Encrypted) transaction") and transaction amount less than 100 and Merchant MCC code not in ("Convenience Stores and Specialty Markets", "Shopping Services", "Fast Food Restaurants") then do ...

Rule5: If POS entry mode not in ("Internet/Ecommerce, No Security or Unable to determine security level transaction", "Internet/Ecommerce (3D Secure) transaction", "Internet/Ecommerce (Channel Encrypted) transaction") and foreign country transaction = "Yes" and number of non foreign transactions in past year less than or equal to 10 then do ...

Rule6: If POS entry mode not in ("Internet/Ecommerce, No Security or Unable to determine security level transaction", "Internet/Ecommerce (3D Secure) transaction", "Internet/Ecommerce (Channel Encrypted) transaction") and foreign country transaction = "Yes" and number of non foreign transactions in past year more than 10 then do ...

Rule7: If POS entry mode not in ("Internet/Ecommerce, No Security or Unable to determine security level transaction", "Internet/Ecommerce (3D Secure) transaction", "Internet/Ecommerce (Channel Encrypted) transaction") and foreign country transaction ^= "Yes" and transaction amount more than or equal to 250 then do ...

Rule8: If POS entry mode not in ("Internet/Ecommerce, No Security or Unable to determine security level transaction", "Internet/Ecommerce (3D Secure) transaction", "Internet/Ecommerce (Channel Encrypted) transaction") and foreign country transaction ^= "Yes" and transaction amount less than 250 then do ...

FIG. 20

AUTOMATICALLY GENERATING RULES FOR EVENT DETECTION SYSTEMS

REFERENCE TO RELATED APPLICATION

This claims the benefit of priority under 35 U.S.C. § 119(e) to U.S. Provisional Patent Application No. 63/092,463, filed Oct. 15, 2020, and to U.S. Provisional Patent Application No. 63/122,370, filed Dec. 7, 2020, the entirety of each of which is hereby incorporated by reference herein.

TECHNICAL FIELD

The present disclosure relates generally to computerized event-detection systems. More specifically, but not by way of limitation, this disclosure relates to automatically generating rules for event detection systems.

BACKGROUND

Many industries use event detection systems to detect various types of events. Event detection systems can include one or more pieces of software configured to detect (e.g., in real time) one or more types of events by analyzing data, such as big data streamed from multiple sensors or other sources. One industry in which event detection systems are commonly used is the cybersecurity industry. In the cybersecurity context, event detection systems may include intrusion detection software or antivirus software. For example, a computer network may include an intrusion detection software configured to detect and alert a system operator about potential cybersecurity events such as attempted network attacks. As another example, a computer system may include antivirus software configured to detect and notify a system administrator about malicious code. Other industries also use event detection systems. For example, event detection systems can be used to detect fraudulent transactions or money laundering. As another example, event detection systems can be used to detect problems in an energy or manufacturing plant, such as hazardous conditions or the failure of a component (e.g., a furnace, valve, cooling system, turbine, or conveyor belt).

SUMMARY

One example of the present disclosure includes a system that comprises one or more processing devices and one or more memory devices including instructions that are executable by the one or more processing devices for causing the one or more processing devices to perform operations. The operations can include extracting a plurality of logical rules from a plurality of trained decision trees, each logical rule in the plurality of logical rules corresponding to a pathway from a root node to a leaf node in a respective decision tree of the plurality of trained decision trees. The operations can include applying a test data set to the plurality of logical rules to determine a plurality of count values by, for each item of test data in the test data set: determining one or more logical rules among the plurality of logical rules that are satisfied by the item of test data; determining whether a logical rule of the one or more logical rules yields a target result provided in the item of test data; and adjusting one or more count values, of the plurality of count values, corresponding to the one or more logical rules depending on whether the logical rule yields the target result. The operations can include determining a plurality of performance metric values based on the plurality of count values. The operations can include selecting a subset of logical rules from among the plurality of logical rules by comparing the plurality of performance metric values to a predefined threshold. The operations can include providing at least one logical rule in the subset of logical rules for use with an event detection system that is configured to detect an event in relation to a target data set that was not used to train the plurality of trained decision trees.

Another example of the present disclosure includes a method comprising operations. The operations can include extracting a plurality of logical rules from a plurality of trained decision trees, each logical rule in the plurality of logical rules corresponding to a pathway from a root node to a leaf node in a respective decision tree of the plurality of trained decision trees. The operations can include applying a test data set to the plurality of logical rules to determine a plurality of count values by, for each item of test data in the test data set: determining one or more logical rules among the plurality of logical rules that are satisfied by the item of test data; determining whether a logical rule of the one or more logical rules yields a target result provided in the item of test data; and adjusting one or more count values, of the plurality of count values, corresponding to the one or more logical rules depending on whether the logical rule yields the target result. The operations can include determining a plurality of performance metric values based on the plurality of count values. The operations can include selecting a subset of logical rules from among the plurality of logical rules by comparing the plurality of performance metric values to a predefined threshold. The operations can include providing at least one logical rule in the subset of logical rules for use with an event detection system that is configured to detect an event in relation to a target data set that was not used to train the plurality of trained decision trees. Some or all of the method's operations can be implemented by one or more processing devices.

Yet another example of the present disclosure includes a non-transitory computer-readable medium comprising program code that is executable by one or more processing devices for causing the one or more processing devices to perform operations. The operations can include extracting a plurality of logical rules from a plurality of trained decision trees, each logical rule in the plurality of logical rules corresponding to a pathway from a root node to a leaf node in a respective decision tree of the plurality of trained decision trees. The operations can include applying a test data set to the plurality of logical rules to determine a plurality of count values by, for each item of test data in the test data set: determining one or more logical rules among the plurality of logical rules that are satisfied by the item of test data; determining whether a logical rule of the one or more logical rules yields a target result provided in the item of test data; and adjusting one or more count values, of the plurality of count values, corresponding to the one or more logical rules depending on whether the logical rule yields the target result. The operations can include determining a plurality of performance metric values based on the plurality of count values. The operations can include selecting a subset of logical rules from among the plurality of logical rules by comparing the plurality of performance metric values to a predefined threshold. The operations can include providing at least one logical rule in the subset of logical rules for use with an event detection system that is configured to detect an event in relation to a target data set that was not used to train the plurality of trained decision trees.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 15 depicts an example of logical rules hit by samples of test data according to some aspects of the present disclosure.

FIG. 16 depicts an example of selected logical rules according to some aspects of the present disclosure.

FIG. 19 depicts an example of a lookup table for translating logical rules into corresponding text according to some aspects of the present disclosure.

FIG. 20 depicts an example of translated logical rules according to some aspects of the present disclosure.

Figure 1:
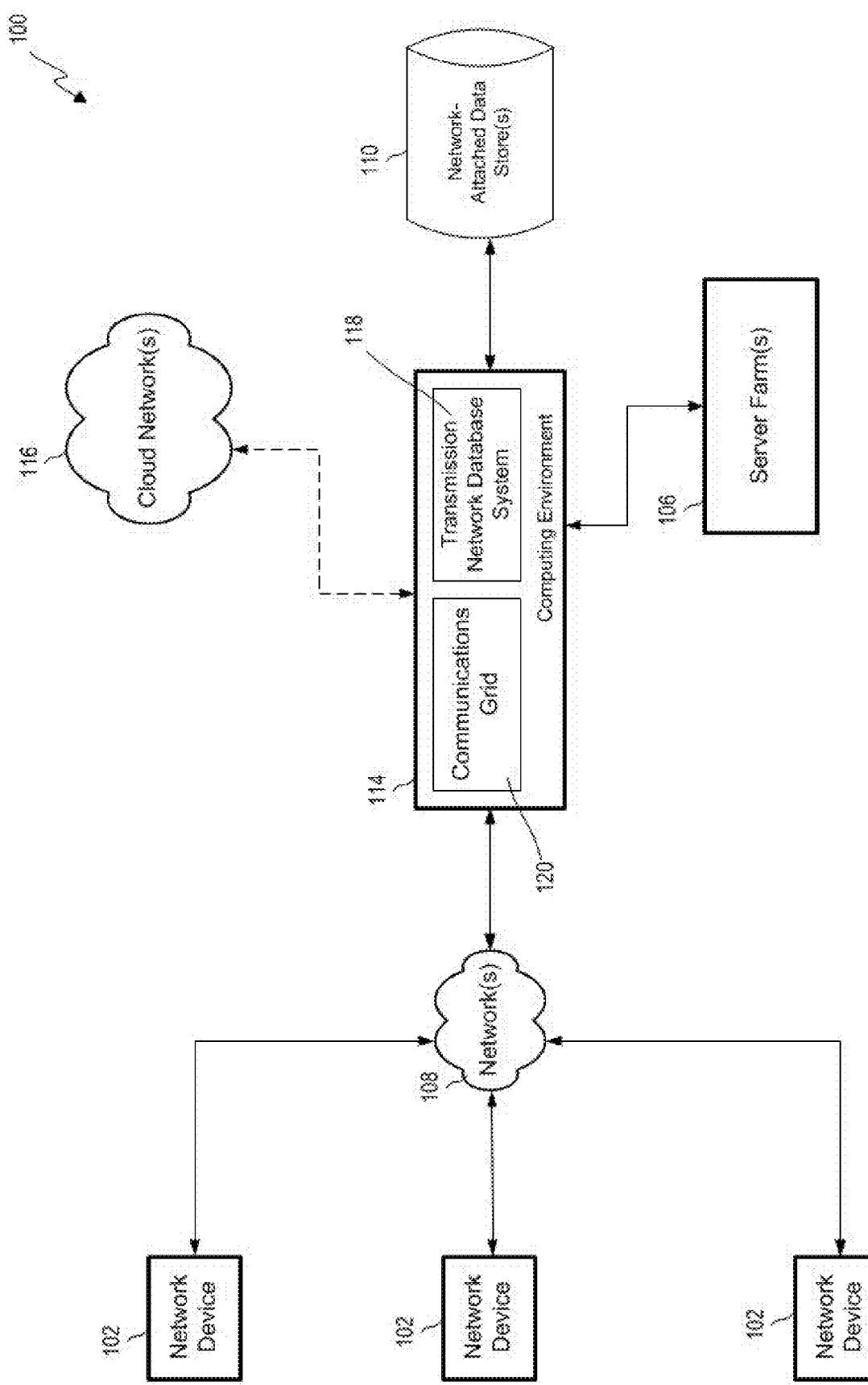
FIG. 1 depicts a block diagram of an example of a computing system according to some aspects.

In the appended figures, similar components or features can have the same reference label. Further, various components of the same type can be distinguished by following the reference label with a lowercase letter that distinguishes among the similar components. If only the first reference label is used in the specification, the description is applicable to any one of the similar components having the same first reference label irrespective of the lowercase letter.

DETAILED DESCRIPTION

Event detection systems are used in many industries to detect various types of events. Event detection systems can include one or more pieces of software configured to detect events based on a set of predefined logical rules. Examples of such events may include cybersecurity events, such as intrusion attempts or the execution of malicious code; the malfunctioning of a component, such as a machine or a nuclear reactor; or an unsafe condition associated with a vehicle. Conventionally, a human expert manually determines these logical rules by selecting and analyzing a small portion of a big dataset (e.g., having thousands or millions of data entries) using their experience and expertise. The human expert then inputs the logical rules into an event detection system. This is a time consuming and tedious process that is largely subjective in nature and highly dependent upon the quality of the portion of the big dataset that is selected for analysis. Given the large amount of data and the complexities involved, it can take an expert or a group of experts weeks to manually develop and input such logical rules. Further, the development of such logical rules is not a static process but rather a dynamic one. An expert may need to periodically add, remove, or update logical rules as new information becomes available, so that the event detection system can detect new types of events or can detect existing events with better accuracy. As one specific example, a cybersecurity expert may need to periodically update the logical rules for an intrusion detection system (IDS) to secure a computer network against new and evolving cyberattacks. Generating logical rules for an event detection system using this manual, complex, subjective, and repetitive process can lead to poor accuracy and missed events, which can have significant security, financial, and safety impacts (among others).

Certain aspects and features of the present disclosure can overcome one or more of the abovementioned problems via a rule-building engine that can automatically generate logical rules for an event detection system. The rule-building engine can automatically generate the logical rules by training a group of decision trees using training data, extracting a set of logical rules from the trained decision trees, and then applying various techniques to the extracted set of logical rules to identify a subset of logical rules that can detect a target event with a high degree of accuracy. This automated process may be faster, more accurate, more objective, and less expensive than traditional manual techniques. The automated process can also be easily repeated at periodic intervals to add, remove, and update logical rules, thereby helping to ensure that the event detection system can detect new types of events or can detect existing events with improved accuracy.

More specifically, the rule-building engine can train a forest of decision trees and extract therefrom a base set of logical rules for detecting a target event. Each of the decision trees in the forest can be trained using a shuffled and randomly selected sample of training data. The union of the logical rules generated by the forest of decision trees may have a significant overlap, so in some examples the rule-building engine can implement a process to stochastically decouple these logical rules and measure the performance of each individual logical rule using test data. In this way, the decoupled performance of the logical rules can be accurately measured. The rule-building engine can then select a subset of the logical rules that are most effective at detecting the target event based on the measured performance of the decoupled rules. Using this approach, the best-performing logical rules can be measured and selected using the true decoupled performance of the logical rules.

In some examples, the rule-building engine can output the selected logical rules in a human-readable format that is easily digestible to humans. For example, the rule-building engine can include a lookup table for translating variable values in the logical rules into corresponding text, so that the logical rules are easily digestible by humans. This can allow for both experts and non-experts to make use of the logical rules. Additionally, the readability, explainability, and interpretability of the logical rules can be important in certain industries such as the finance industry, which has relatively strict regulations around being able to explain the basis on which certain types of decisions are made. Due to these requirements, other approaches like using a neural network to detect events may not be feasible, because neural networks are generally considered "black boxes" that make decisions in ways that often cannot be easily understood or explained.

In some examples, the rule-building engine can also predict a future date at which one or more of the automatically generated logical rules may become ineffective and provide that date to a user. A logical rule can be considered ineffective if it, for example, has a low hit rate, a high false positive rate, or a high false negative rate. For example, certain types of events may only occur during a particular timespan and thus the logical rules used to detect such events may only be necessary during said timespan. The rule-building engine may identify these situations and provide the user with a projected date by which the logical rules may have little or no continuing effect. This may help the user to better understand the logical rules and remove or replace them once they become outdated.

In some examples, the rule-building engine can automatically configure the event detection system based on the automatically determined logical rules. For example, the rule-building engine can provide the logical rules as input to the event detection system, so that the event detection system can detect events based on the logical rules. This can be a faster and more accurate approach to configuring the event detection system than alternative manual approaches, which can be slow and error prone. The rule-building engine can also automatically remove existing logical rules from the event detection system based on various factors, such as if the current date is after a projected date by which the logical rules will become ineffective.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for automatically generating rules for event detection systems according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for automatically generating rules for event detection systems, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and use the data to automatically generate rules for event detection systems.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for automatically generating rules for event detection systems.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for automatically generating rules for event detection systems. For example, the computing environment 114, a network device 102, or both can implement one or more versions of the processes discussed with respect to any of the figures.

Figure 2:
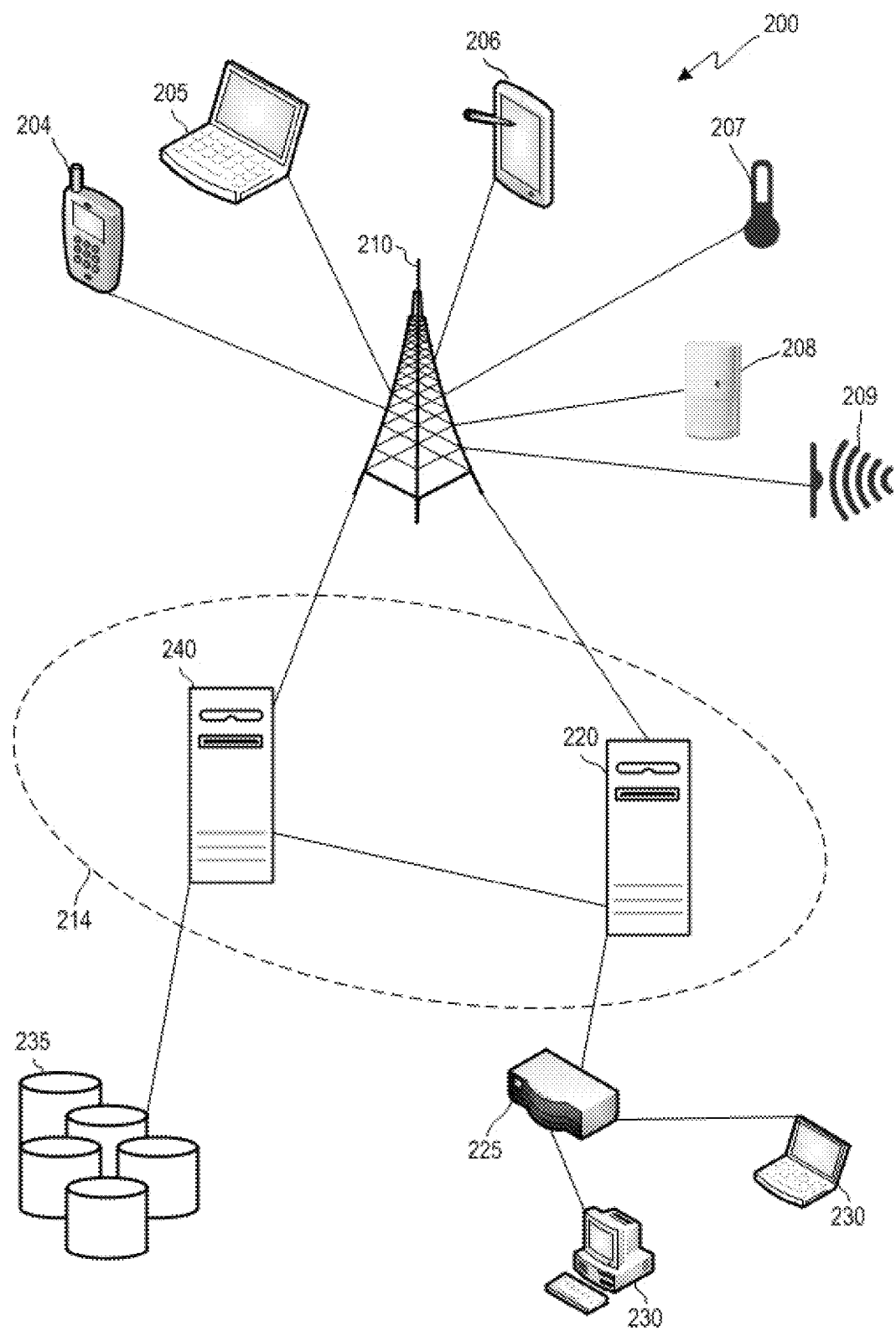
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to automatically generate rules for event detection systems).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for automatically generating rules for event detection systems based on data, the computing environment 214 can perform a pre-analysis of the data. The pre-analysis can include determining whether the data is in a correct format and, if not, reformatting the data into the correct format.

Figure 3:
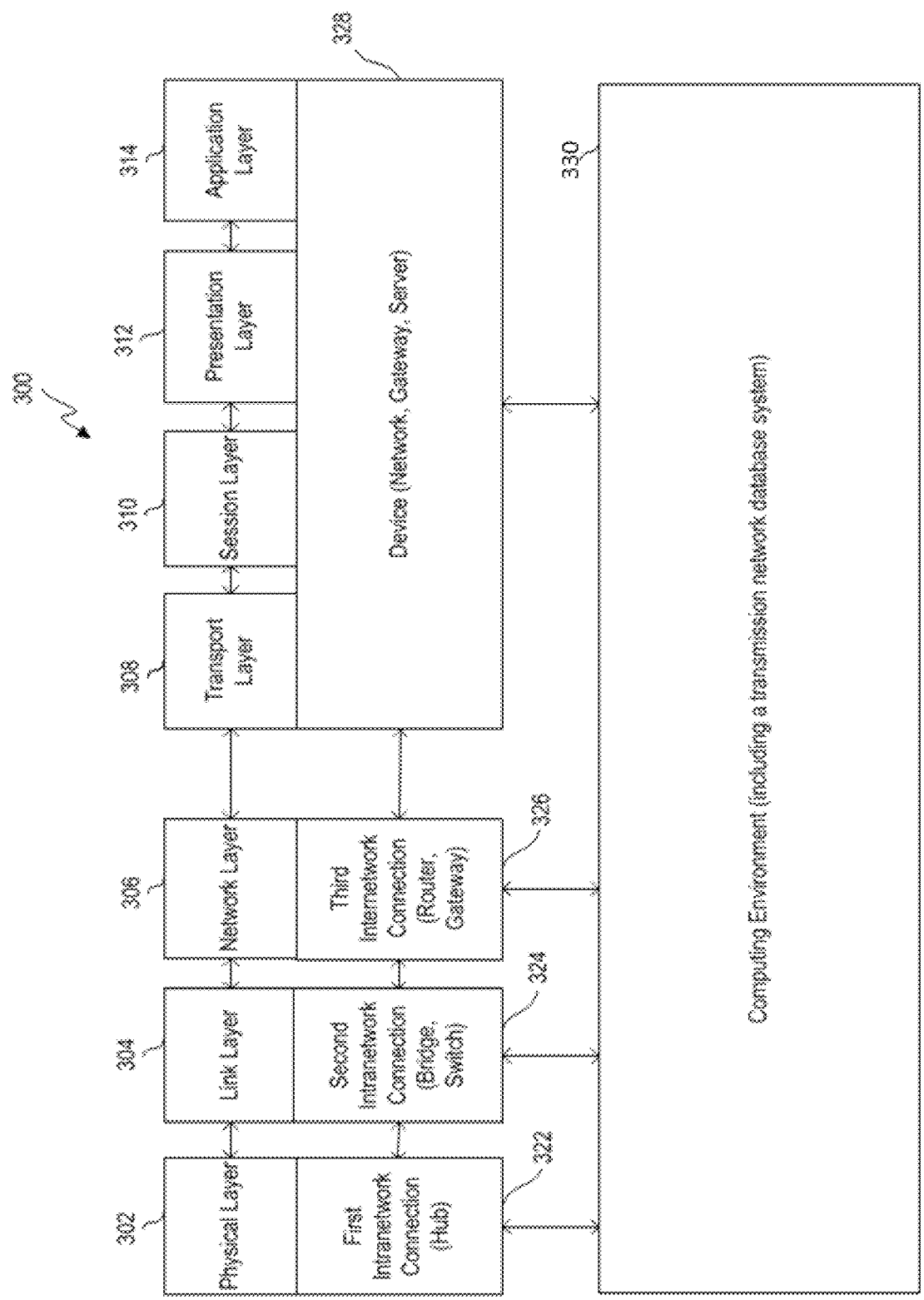
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for automatically generating rules for event detection systems, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for automatically generating rules for event detection systems.

Figure 4:
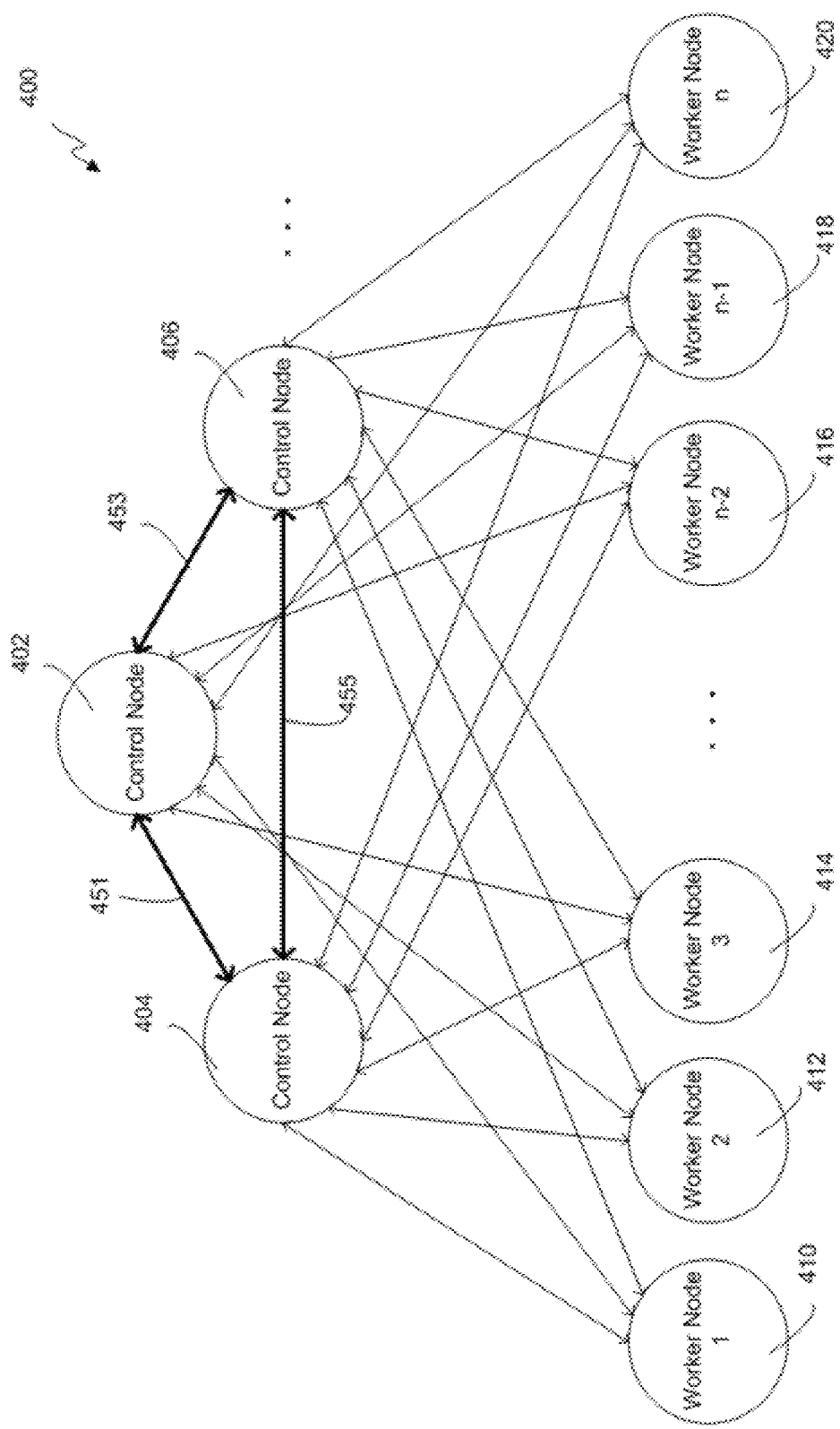
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to automatically generating rules for event detection systems. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for automatically generating rules for event detection systems can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may use at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid indicating that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to automatically generate rules for event detection systems.

Figure 5:
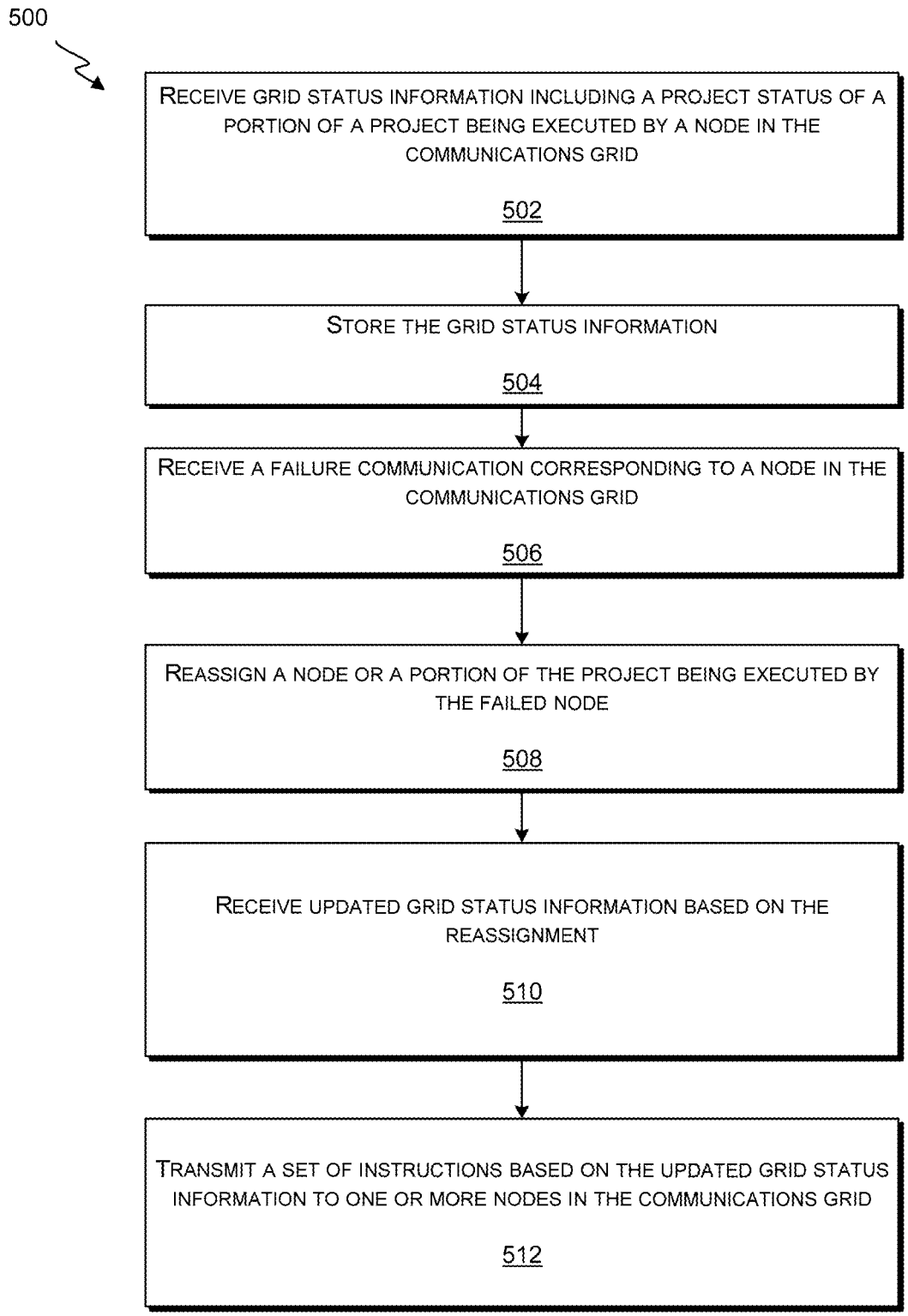
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
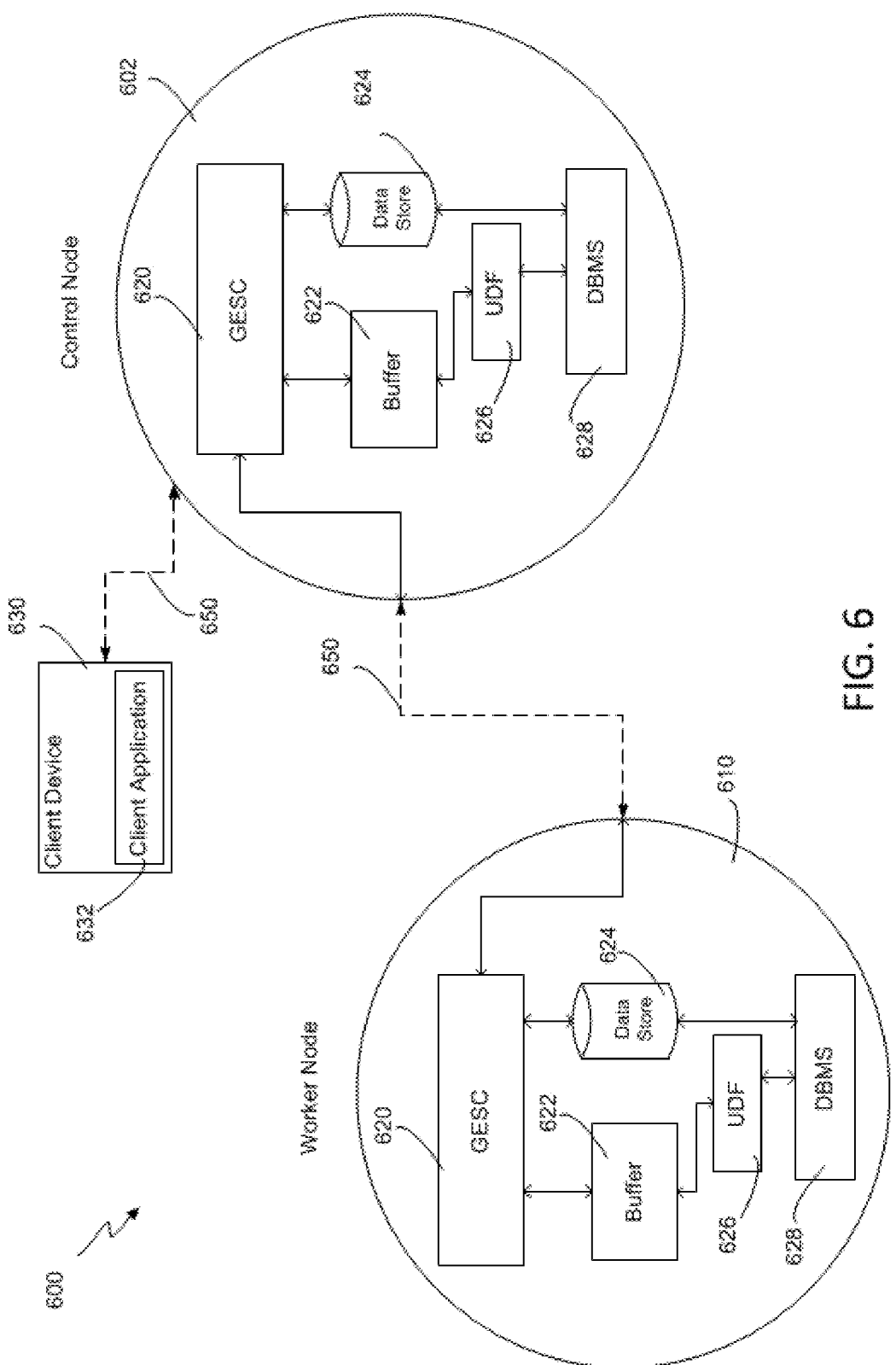
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
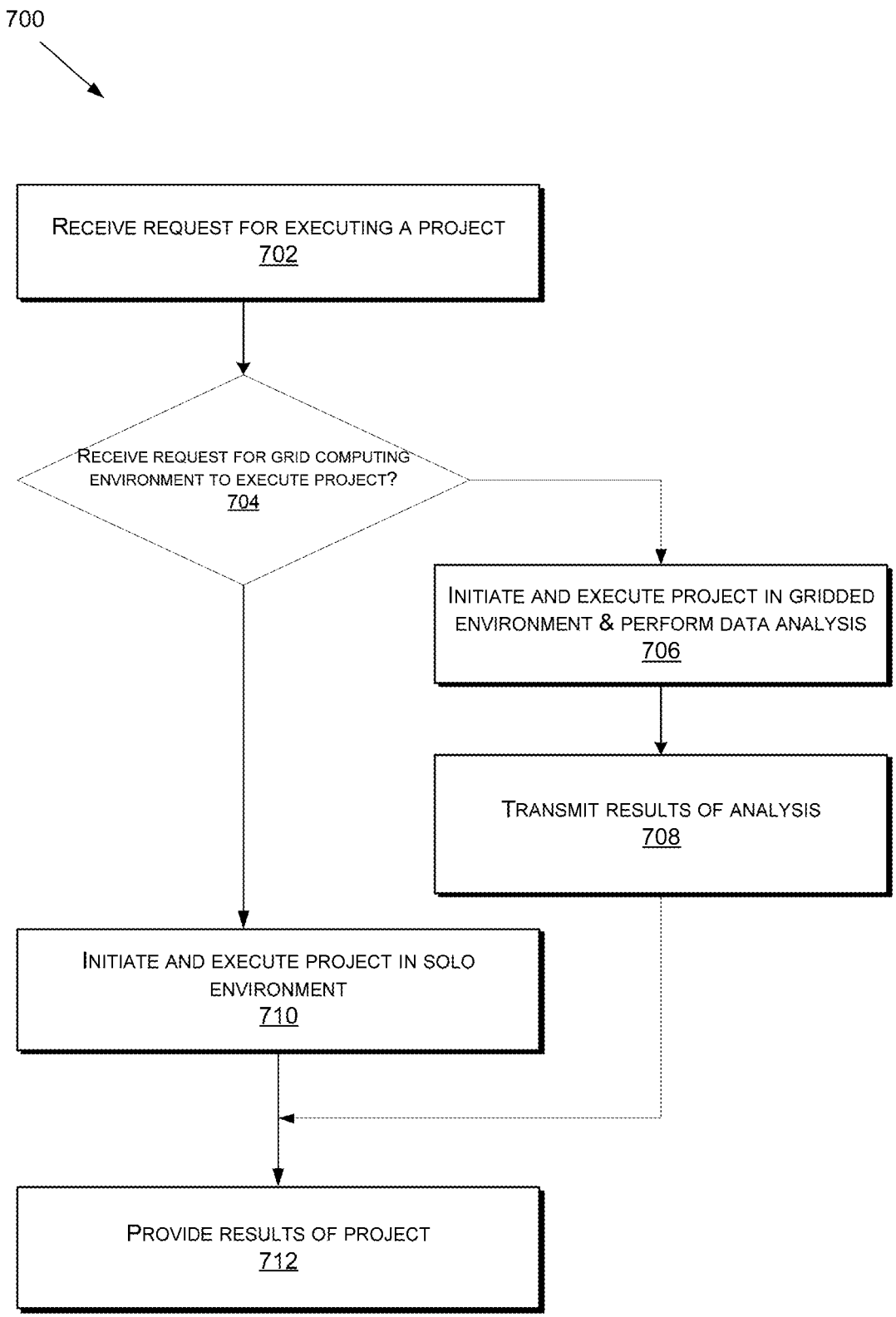
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
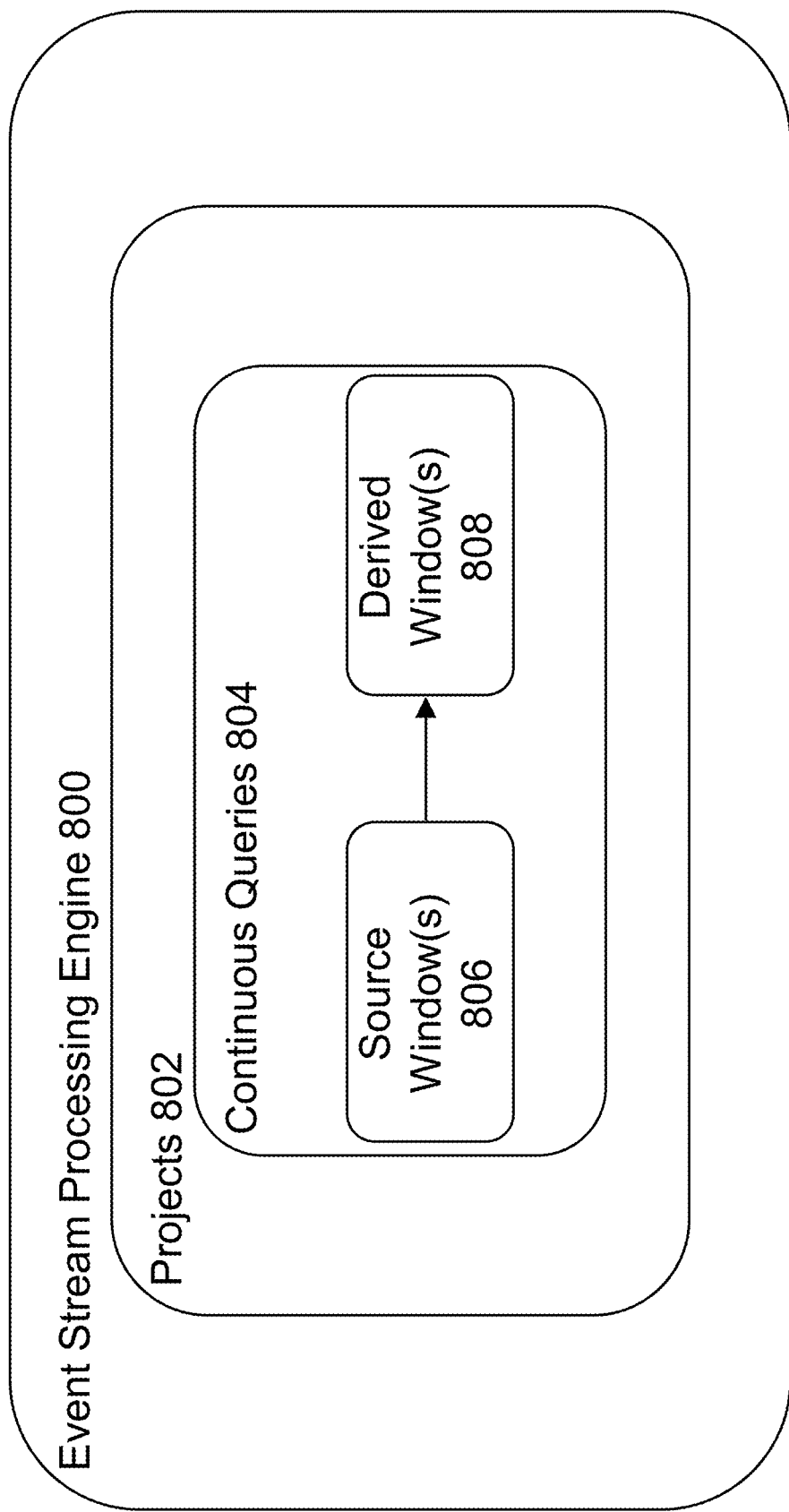
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
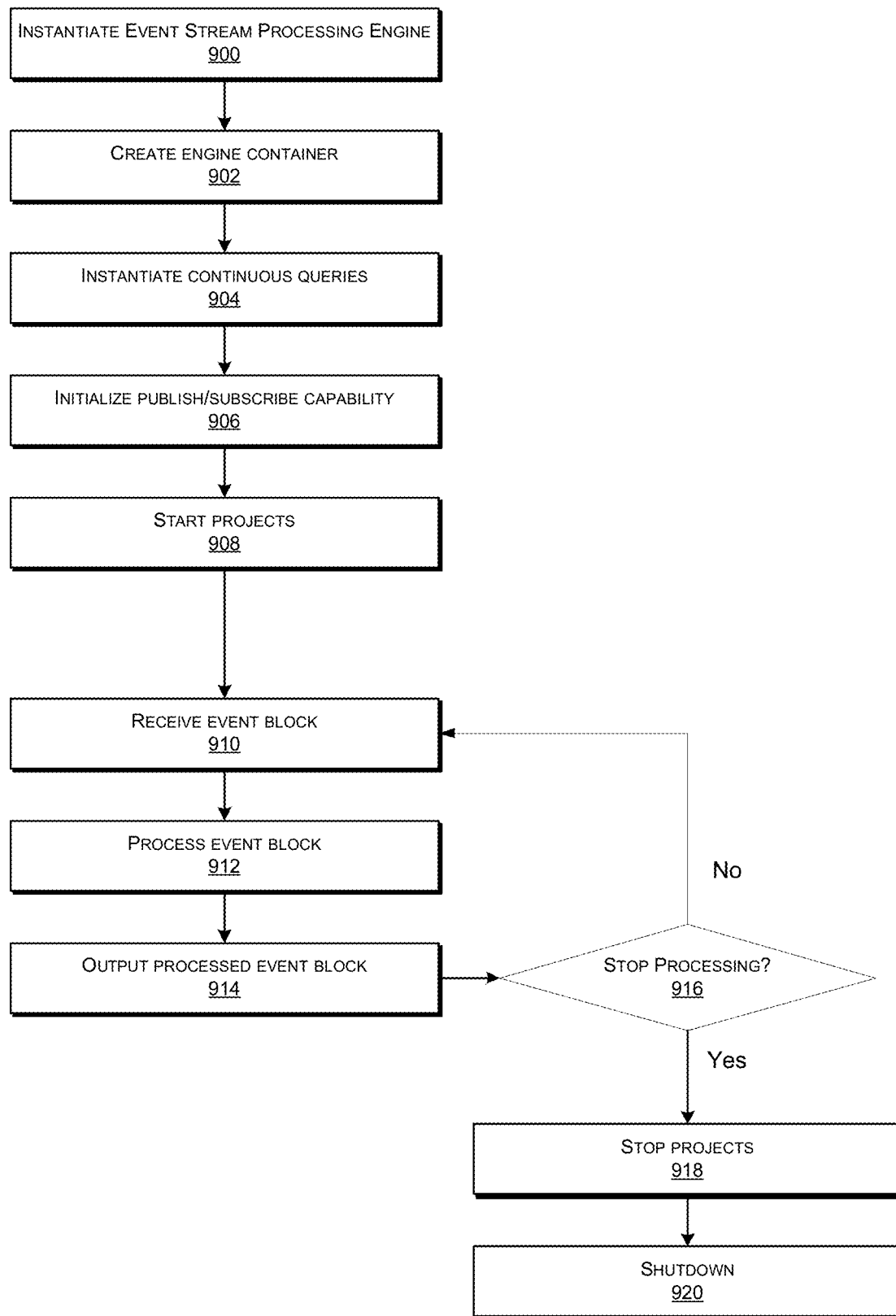
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
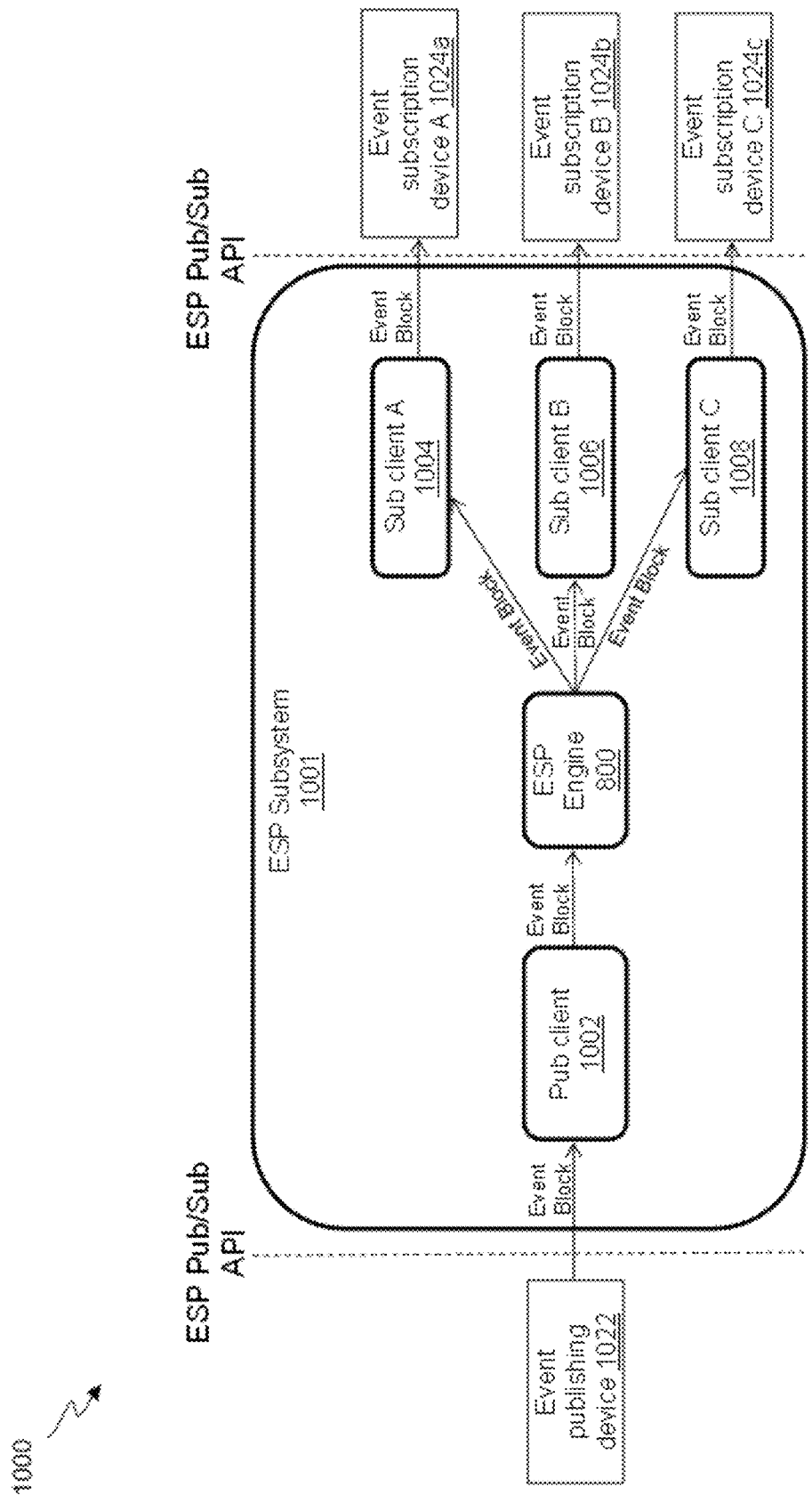
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
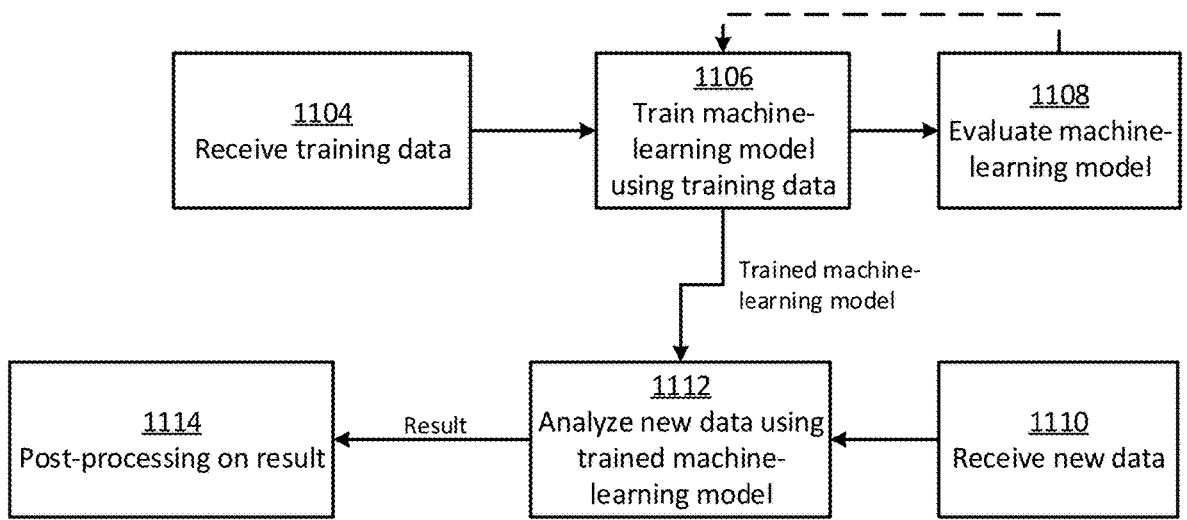
FIG. 11 depicts a flow chart of an example of a process for generating and using a machine learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
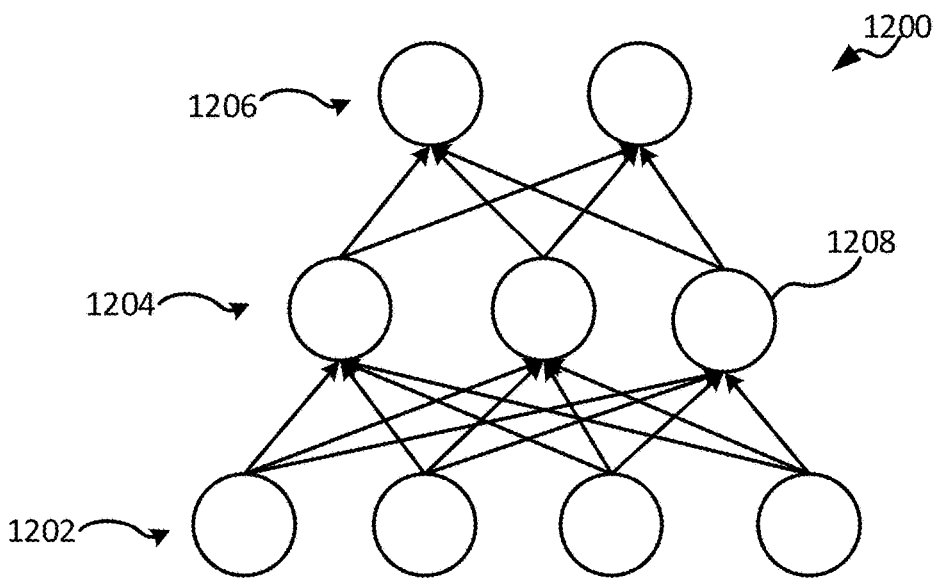
FIG. 12 depicts a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector.

The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
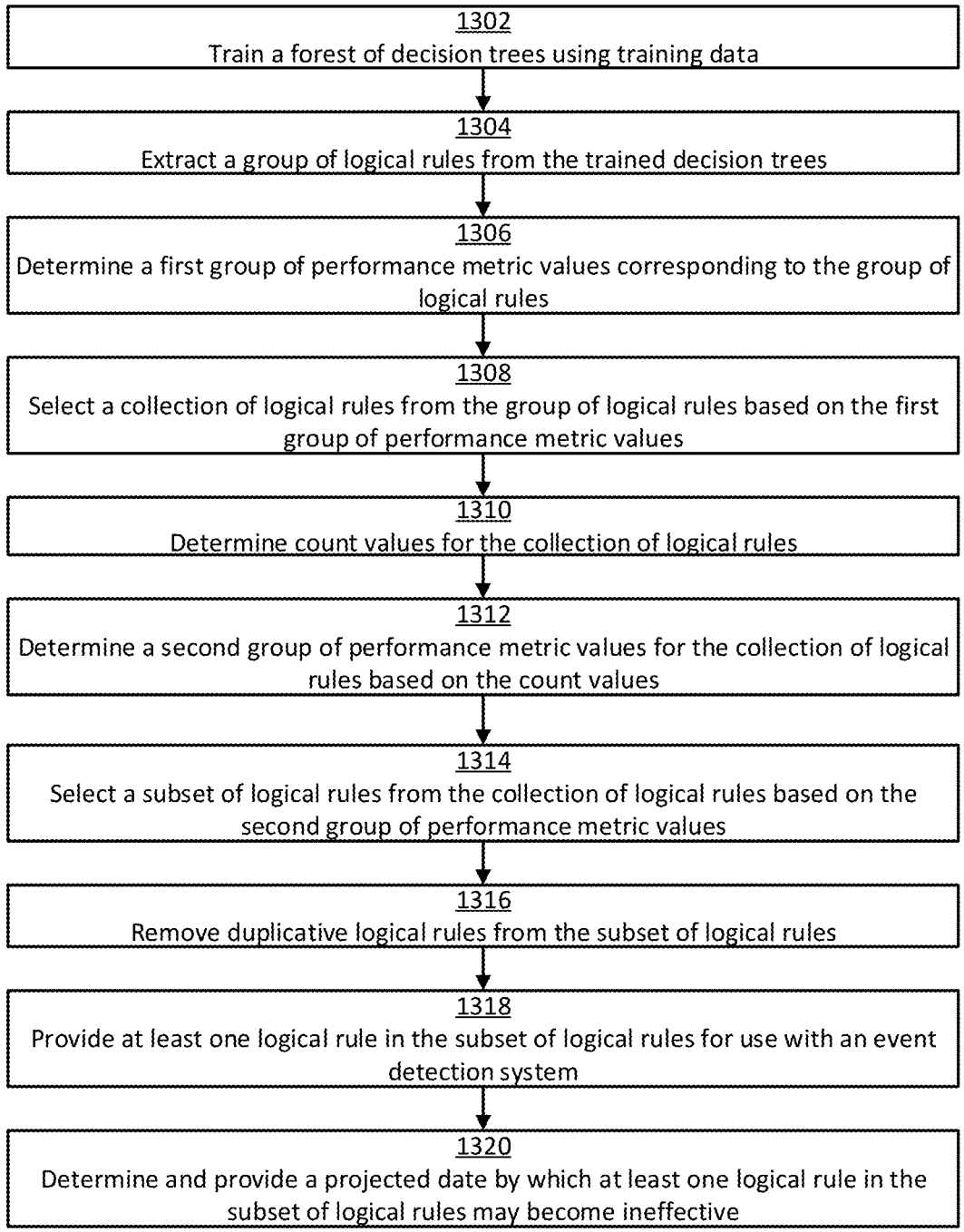
FIG. 13 depicts a flow chart of an example of a process for automatically determining rules for an event detection system according to some aspects of the present disclosure.

FIG. 13 is a flow chart of an example of a process for automatically generating logical rules for an event detection system according to some aspects of the present disclosure. The process can be implemented using any of the systems and methods described above with respect to FIGS. 1-12. Although the process is shown in FIG. 13 has having certain operations, it will be appreciated that other examples may involve more operations, fewer operations, different operations, or a different order of the operations shown in FIG. 13.

In operation 1302, a processing device trains a forest of decision trees using training data. The forest can include any number of decision trees, such as ten decision trees. The training data can include observations (e.g., transactions) correlated to a target variable indicative of a target event. The training data can be split into multiple overlapping datasets, which can be referred to as training partitions. Each training partition can be randomly shuffled and then used to train and validate a decision tree in the forest.

Once trained, each decision tree can include multiple logical rules that include the splitting rules from the topmost decision node (or "root node") to the terminal nodes (or "leaf nodes"). For a target variable that is binary in nature, half of the leaf nodes classify inputs into each binary value.

Figure 14:
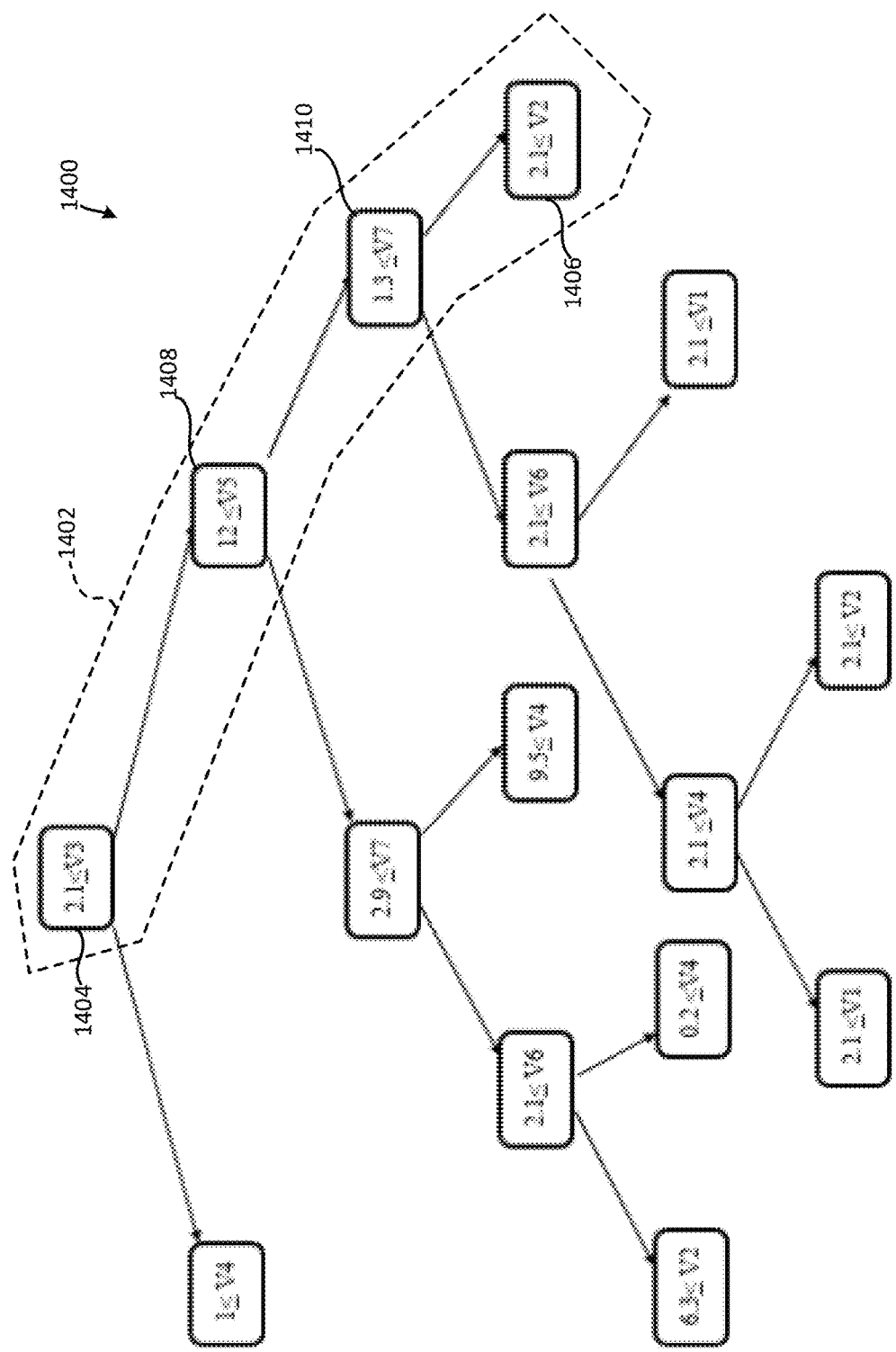
FIG. 14 depicts an example of a decision tree according to some aspects of the present disclosure.

One example of a decision tree 1400 in the forest is shown in FIG. 14. The decision tree 1400 was trained using a set of training data, which may be down sampled and partly balanced. Multiple such decision trees can be trained on different training partitions generated from a larger set of training data. During training, each node of the decision tree 1400 is assigned a splitting rule based on one or more splitting criterion. A collection of splitting rules can form a path 1402 from a root node 1404 to a leaf node 1406. There can be several routes from the root node 1404 to the leaf nodes forming various paths. Each path can start from the root node 1404, split the feature space using each splitting rule, and end up at a leaf node. Each of these paths can represent a single logical rule that includes multiple splitting rules. For example, the path 1402 that includes the splitting rules at node 1404, node 1406, node 1408, and node 1410 can form a single logical rule. As two specific examples, the decision tree 1400 includes the following logical rules:

$$R_1 T_1 = 2.1 \leq V3 \text{ AND } 1 \leq V4$$

$$R_2 T_1 = V3 < 2.1 \text{ AND } 12 \leq V5 \text{ AND } 2.9 \leq V7 \text{ AND } 2.1 \leq V6 \text{ AND } 6.3 \leq V2$$

where $R_x T_1$ means "Rule X from Decision Tree number one" and "VX" means Variable X.

In operation 1304, the processing device extracts a group of logical rules from the trained decision trees. For example, the decision tree 1400 shown in FIG. 14 includes 8 logical rules formed from the various paths from the root node 1404 to the leaf nodes. The processing device can extract some or all of those logical rules from the decision tree 1400. The processing device can perform a similar process with respect to the other decision trees in the forest.

In operation 1306, the processing device determines a first group of performance metric values corresponding to the group of logical rules. Examples of such performance metrics can be a false positive rate or a false negative rate. A false positive rate can be a rate at which a logical rule incorrectly flags an input as corresponding to the target event. A false negative rate can be a rate at which a logical rule incorrectly flags an input as not corresponding to the target event. The processing device can determine the first group of performance metric values using test data. The test data can include observations correlated to a target variable indicative of the target event. In some examples, the test data can be a subset of the training data that was reserved for testing purposes. The processing device can apply the test data to the logical rules to determine a respective performance metric value for each logical rule in the group of logical rules.

In operation 1308, the processing device selects a collection of logical rules from the group of logical rules based on the first group of performance metric values. For example, the processing device can compare the performance metric value for each respective logical rule to a predefined threshold. If the performance metric value for a particular logical rule is greater than the predefined threshold, the processing device can incorporate the logical rule into the collection of logical rules. Otherwise, the processing device can discard the logical rule. In an alternative example, if the performance metric value for a particular logical rule is below the predefined threshold, the processing device can incorporate the logical rule into the collection of logical rules. Otherwise, the processing device can discard the logical rule. Either of these approaches may be used depending on the implementation details. In this way, logical rules that do not perform relatively well may be excluded from a remainder of the analysis, which can conserve time and computing resources (e.g., memory, processing power, and electricity).

One example of this process for eliminating logical rules is shown in FIG. 15. As shown, the table 1500 includes a first column with samples 1502 (e.g., entries) from test data, a second column 1504 with logical rules from a first decision tree ("Tree$_1$") of the forest, a third column with logical rules from a second decision tree ("Tree$_2$") of the forest, a fourth column with logical rules from a third decision tree ("Tree$_3$") of the forest, and a fifth column for a target variable that is indicative of a target event to be detected. Each individual decision tree generates multiple logical rules and guarantees that the logical rules have no overlap, such that the logical rules generated by a single decision tree are mutually exclusive and exhaustive. As a result, each sample 1508 of the test data will hit only one logical rule 1510 from a particular decision tree (e.g., Trees). A sample can be said to "hit" a logical rule (or vice versa) if the sample satisfies the conditions expressed in the logical rule. Because there are multiple individual decision trees, the same sample may hit to multiple logical rules across the multiple decision trees. For example, Sample$_2$ may hit $R_7T_1$, $R_5T_2$, and $R_5T_3$.

Still referring to FIG. 15, a performance metric value for each logical rule can be determined by counting the number of correct hits or the number of incorrect hits with respect to a binary target value 1506 that is associated with the logical rule. The performance metrics for the logical rules can then be compared to a predefined threshold so that poor-performing logical rules can be eliminated. For example, the false positive rate for $R_1T_1$ can be compared to a predefined threshold and, if the false positive rate exceeds the predefined threshold, that logical rule can be eliminated. As another example, the false positive rate for $R_2T_1$ can be compared to the predefined threshold and, if the false positive rate exceeds the predefined threshold, that logical rule can be eliminated. And so on. The remaining rules after this elimination process are shown in bold in FIG. 15. For example, the remaining rules after this elimination process may include $R_7T_1$, $R_5T_3$, $R_3T_2$, $R_7T_1$, $R_2T_2$, $R_3T_3$, and $R_5T_1$. These remaining rules are further shown in FIG. 16 and described in greater detail below. Of course, the examples shown in FIGS. 15-16 are for illustrative purposes and intended to be non-limiting. Other examples may include more logical rules, fewer logical rules, or different logical rules than are shown.

The resulting collection of logical rules can be a union of the non-eliminated rules from the original forest of decision trees. The logical rules in the collection can serve as candidates for the final set of logical rules. Because the logical rules in the collection are derived from multiple distinct decision trees, it is possible for two or more of the logical rules to substantially overlap, in the sense that they may detect the target event under similar or identical conditions. To account for these overlaps, the collection of logical rules may undergo further analysis as described below.

In operation 1310, the processing device determines count values for the collection of logical rules. The count values can indicate the decoupled performance of each logical rule. The decoupled performance of a logical rule can be the performance of the logical rule independent of other logical rules. To determine the count values, the processing device can apply an analysis scheme designed to assign proper credits and penalties to each logical rule in the collection.

More specifically, the analysis scheme can involve applying samples from the test data to the logical rules in the collection. For each sample, there are three possible scenarios: (1) the sample does not hit any logical rules in the collection, (2) the sample hits only one logical rule in the collection, or (3) the sample hits multiple logical rules in the collection. For each sample that hits more than one logical rule, the processing device can select (e.g., randomly select) one of the logical rules and assign credits and penalties based on the selected logical rule.

For example, FIG. 16 depicts a table 1600 that includes the collection of logical rules. A particular sample of test data, such as Sample$_2$, may hit multiple logical rules 1608. One of the multiple logical rules 1608, such as $R_7T_1$, may be randomly selected by the processing device for further analysis. The selected rule 1604 may be included in a new field 1606 of the table 1600, which in this example is titled RSR (which stands for "randomly selected rule"). If the selected rule 1604 for the sample of test data produces the correct target value 1506, the multiple logical rules 1608 may each be credited a proportion of a point. The amount of the point credited can be proportional to the number of logical rules that are hit by the sample. For example, since there are two logical rules in the multiple logical rules 1608, each of the logical rules may have its own credit counter that is incremented by 0.50. On the other hand, if the selected rule 1604 for the sample of test data does not produce the correct target value 1506, each of the logical rules may have its own penalty counter that is incremented by 0.50. As another example, if there were three logical rules that were hit by the sample rather than two logical rules, then each of the logical rules could be credited or penalized 0.33 points. As yet another example, if there were four logical rules that were hit by the sample, then each of the logical rules could be credited or penalized 0.25 points. This process can be repeated for some or all of the samples in the test data, which can be millions of samples. Based on the Law of Large Numbers, each logical rule should receive its proportional share of credits and penalties due to the large number of samples and the random selection of the overlapping logical rules that are hit by each sample.

In operation 1312, the processing device determines a second group of performance metric values corresponding to the collection of logical rules based on the count values. As one example, if the credit counter value for a logical rule is 57 and the penalty counter value for the logical rule is 33, the net performance of the logical rule can be 57−33=24. The processing device can determine this net performance and use it as a performance metric value for the logical rule. In an alternative example, a logical rule may have a single corresponding counter that is incremented for credits and decremented for penalties. The processing device can determine this single counter value and use it as the performance metric value. Additionally or alternatively, the performance metric for a logical rule can calculated based on the credit counter value or the penalty counter value corresponding to the logical rule. For example, the performance metric for a logical rule can be a false positive rate, a false negative rate, or a hit rate that is determined based on the credit counter value or the penalty counter value corresponding to the logical rule.

In operation 1314, the processing device selects a subset of logical rules from the collection of logical rules based on the second group of performance metrics. For example, the processing device can compare the second group of performance metrics to a predefined threshold, which may be different from the predefined threshold described above with respect to operation 1308. If the performance metric for a particular logical rule exceeds the predefined threshold, then the processing device can incorporate the logical rule in the subset. Otherwise, the processing device can discard the logical rule. In an alternative example, if the performance metric value for a particular logical rule is below the predefined threshold, the processing device can incorporate the logical rule into the subset. Otherwise, the processing device can discard the logical rule. Either of these approaches may be used depending on the implementation details. In some examples, the processing device may select the logical rules for the subset based on multiple criterion. For example, the processing device may select the top 50 logical rules having the least false positive rates or the highest hit rates. As another example, the processing device may select logical rules with false positive rates of less than 10% or hit rates of more than 10%. Any number and combination of criteria can be used to select the logical rules for the subset. By excluding logical rules using these techniques, logical rules that are relatively low performing may be excluded from a remainder of the analysis, which can conserve time and computing resources (e.g., memory, processing power, and electricity).

In operation 1316, the processing device removes duplicative logical rules from the subset of logical rules. In some examples, duplicative rules can include logical rules that are identical to one another. For example, the processing device can compare the logical rules in the subset of logical rules to one another to determine if any two logical rules in the subset are identical to one another. If so, one of the logical rules is duplicative of the other. So, the processing device can remove one of the two logical rules from the subset.

Figure 17:
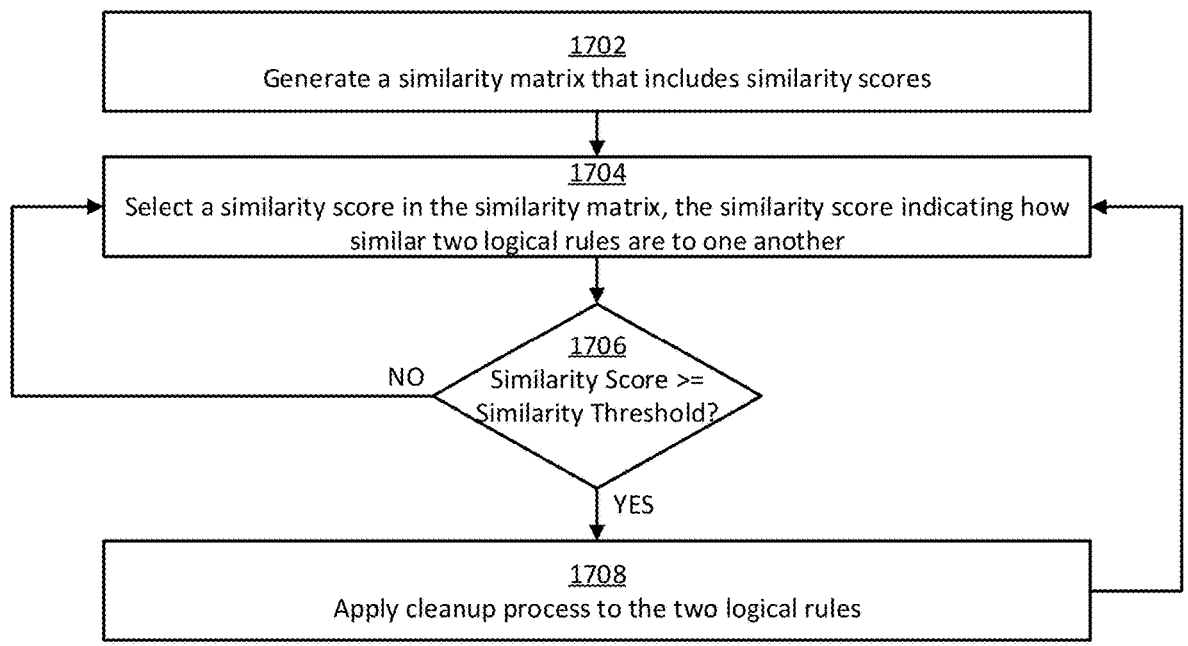
FIG. 17 depicts a flow chart of an example of a process for identifying duplicative logical rules according to some aspects of the present disclosure.

In some examples, duplicative rules can include logical rules that are substantially similar or overlapping (e.g., they flag some or all of the same samples in the test data). The processing device may identify and remove such duplicative rules from the subset using the process shown in FIG. 17. As shown in FIG. 17, in operation 1702, the processing device generates a similarity matrix. The columns of the similarity matrix can correspond to the logical rules in the subset of logical rules, and the rows in the similarity matrix can also correspond to the logical rules in the subset of logical rules. For example, if there are 25 logical rules in the subset of logical rules, then the similarity matrix can be a 25×25 matrix having intersections between every combination of logical rules in the subset. Each cell in the matrix can be at the intersection of two logical rules and include a similarity score indicating how similar the two logical rules are to one another.

In some examples, the processing device can determine a similarity score for two logical rules using the following equation:

$$\text{Similarity Score} = \frac{2*\text{Occurrence of both Rule 1 and Rule 2}}{\text{Occurrence of Rule 1} + \text{Occurrence of Rule 2}}$$

where the "occurrence of both Rule 1 and Rule 2" can be the number of samples in the test data that hit both Rule 1 and Rule 2; the "Occurrence of Rule 1" can the number of samples in the test data that hit Rule 1 and not Rule 2; and the "Occurrence of Rule 2" can the number of samples in the test data that hit Rule 2 and not Rule 1. The processing device can determine these values, for example while performing operation 1310 of FIG. 13, and use them to determine similarity scores for every pair of logical rules in the subset of logical rules. Of course, the above equation is intended to be illustrative and non-limiting, and other examples may use different equations for determining similarity scores.

In operation 1704, the processing device selects a similarity score in the similarity matrix, whereby the similarity score indicates how similar two logical rules are to one another.

In operation 1706, the processing device compares the similarity score to a predefined similarity threshold, which may be selected by a user. If the similarity score is less than the predefined similarity threshold, then two logical rules may not be substantially similar (e.g., overlapping) and the process can return to operation 1704. Otherwise, the process can proceed to operation 1708.

In operation 1708, the processing device applies a cleanup process to the two logical rules. In some examples, the cleanup process can involve deleting one of the two logical rules, thereby reducing duplicative rules in the subset of logical rules. In other examples, the cleanup process can involve merging the two logical rules together, for example by combining one or more of the criteria in a first logical rule with one or more criteria in a second logical rule, to arrive at a single logical rule. After applying the cleanup process, the process can return to operation 1704 where another similarity score can be selected. This process can repeat until some or all of the similarity scores have been analyzed.

Returning to FIG. 13, in operation 1318 the processing device provides at least one logical rule in the subset of logical rules for use with an event detection system. For example, the processing device can automatically configure the event detection to use the at least one logical rule. This may involve supplying the at least one logical rule as input to the event detection system. As another example, the processing device can output the at least one logical rule on a display device (e.g., a liquid crystal display or light-emitting diode display) for a user, so that the user can program the event detection system with the at least one rule. As still another example, the processing device can transmit an electronic communication indicating the at least one logical rule to a client device via a network (e.g., a local area network or the Internet). Examples of the client device can include a laptop computer, a desktop computer, a mobile phone, or a tablet. The client device can receive the electronic communication and output the at least one logical rule to a user of the client device, so that the user can input the at least one logical rule to the event detection system.

Figure 18:
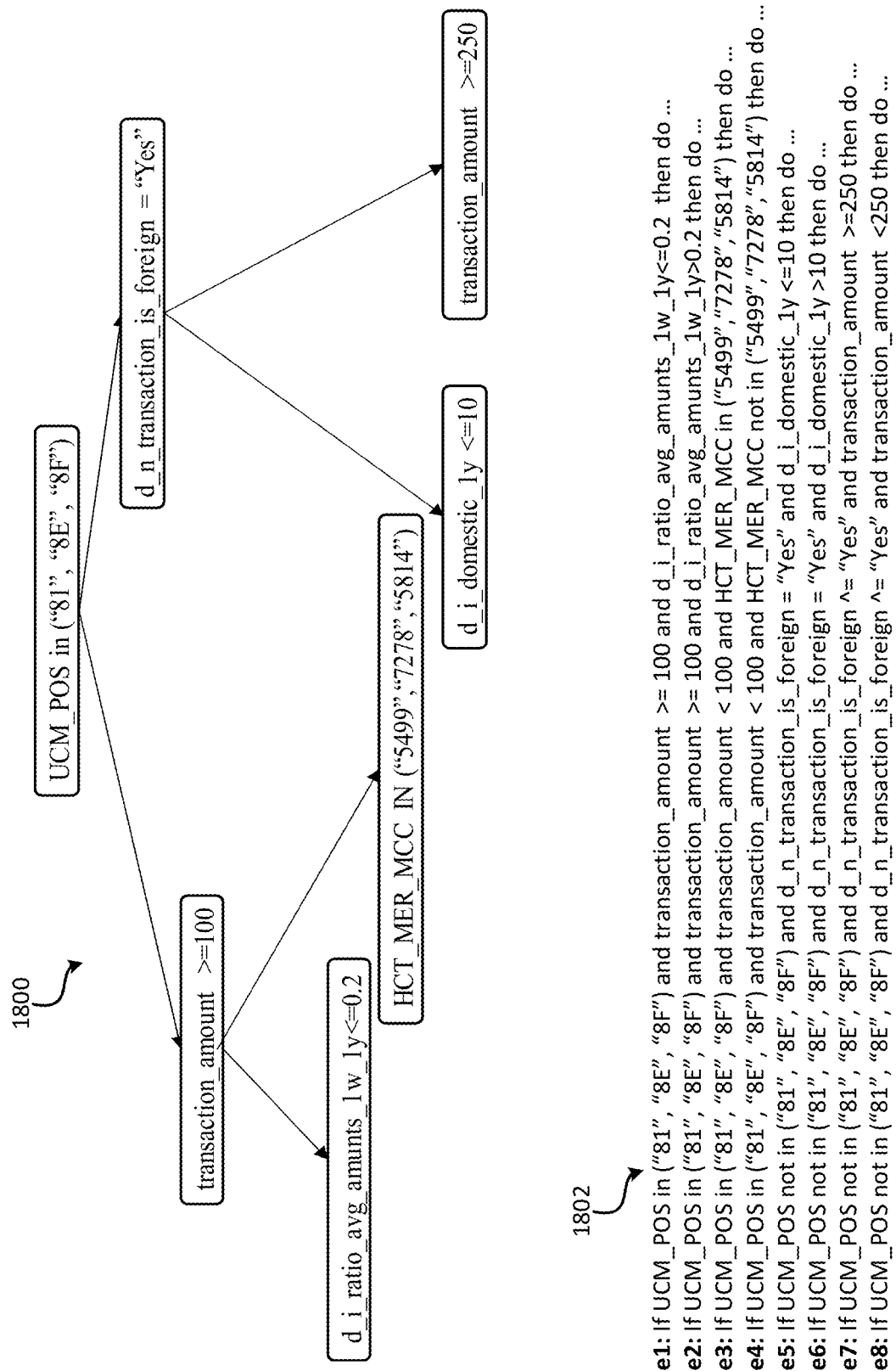
FIG. 18 depicts an example of a decision tree and corresponding logical rules according to some aspects of the present disclosure.

In some examples, the processing device can translate the at least one logical rule into a human-readable format prior to providing it to a user. To that end, the processing device may access a lookup table for translating variable values in the logical rules into corresponding text, so that the logical rules are easily digestible by humans. For example, the processing device can extract logical rules 1802 from the decision tree 1800 shown in FIG. 18. The processing device can then use the lookup table 1900 shown in FIG. 19 to translate the logical rules 1802 into the translated logical rules 2000 shown in FIG. 20. As one particular example, the processing device can select Rule1 of the logical rules 1802 shown in FIG. 18. The processing device can then replace some or all of the keys in Rule1 with their data values (e.g., textual equivalents) in the lookup table 1900 shown in FIG. 19. This can produce Rule1 of the logical rules 2000 shown in FIG. 20. Using this approach, the logical rules can be translated into a more digestible format that can allow for both experts and non-experts to better understand the logical rules.

In operation 1320, the processing device determines and provides a projected date by which at least one logical rule in the subset of logical rules may become ineffective. The processing device can determine the projected date using any number and combination of techniques. In some examples, the processing rule can determine the projected date by implementing the process shown in FIG. 21. Other examples may include more operations, fewer operations, different operations, or a different order of the operations than are shown in FIG. 21.

Figure 21:
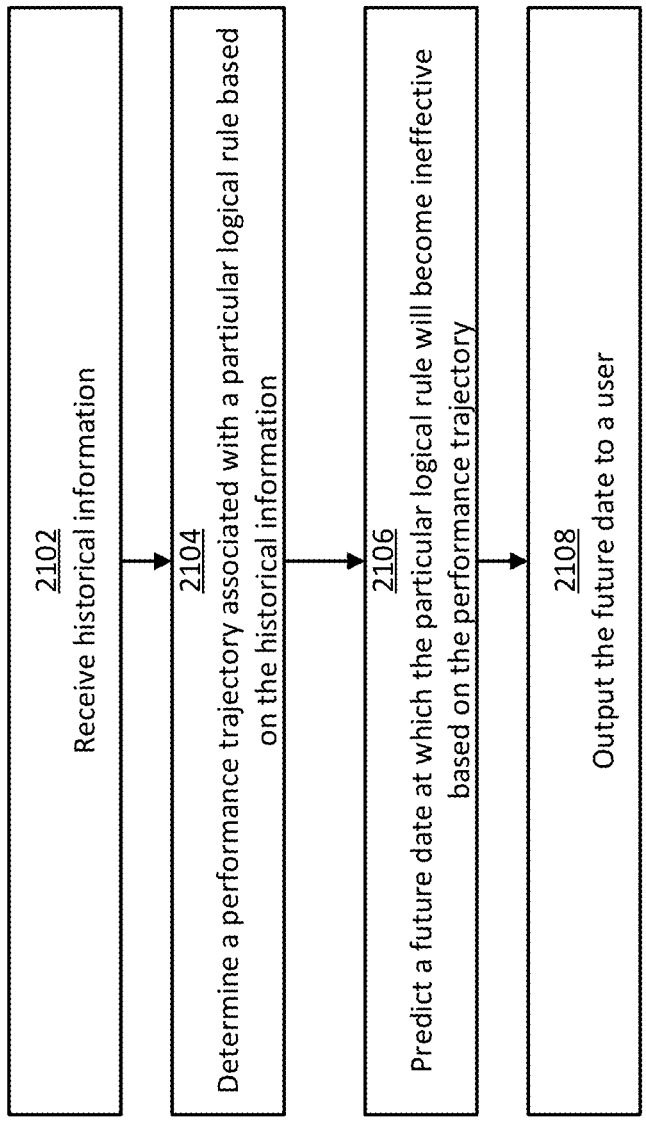
FIG. 21 depicts a flow chart of an example of a process for predicting a future date at which a logical rule may lose efficacy according to some aspects of the present disclosure.
Figure 22:
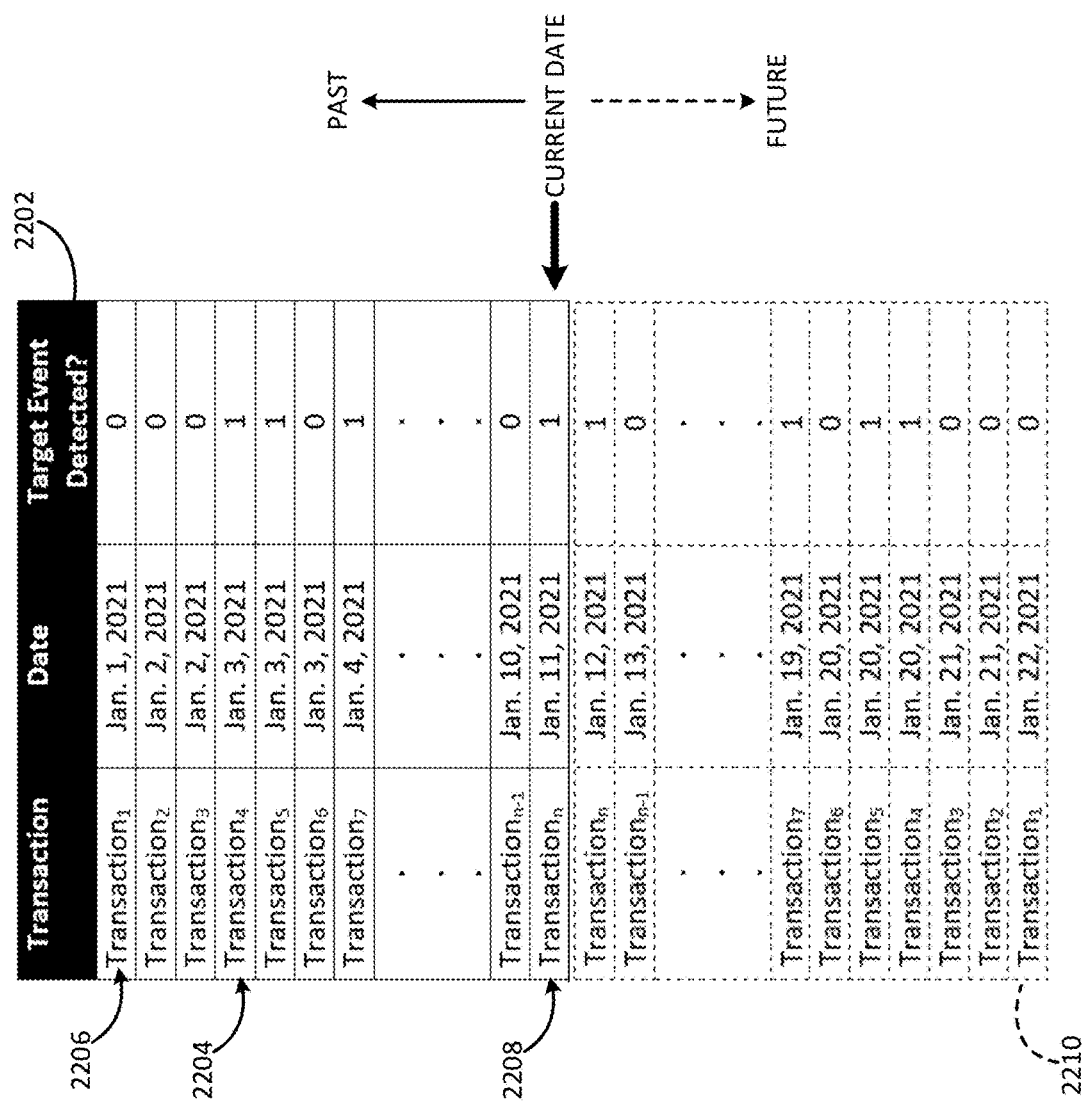
FIG. 22 depicts an example of historical information according to some aspects of the present disclosure.

Referring now to FIG. 21, in operation 2102 the processing device receives historical information. The historical information may be received from a database or any other suitable source. An example of the historical information 2202 is shown in FIG. 22. As shown, the historical information 2202 can describe n transactions (e.g., transaction 2204) that occurred during a prior time period. The prior time period can span from a first date 2206 that is not associated with the target event to a second date 2208 that is associated with the target event. For example, the first date 2206 may be a date at which the target event was not detected and the second date 2208 may be a date at which the target event was detected.

In operation 2104, the processing device determines a performance trajectory associated with a particular logical rule based on the historical information. For example, the processing device can determine the transactions that occurred during the prior time period, reverse the order of the transactions, and generate a projection that includes the reversed order of the transactions out into the future (e.g., from the current date). An example of such a projection 2210 is shown in dashed table of FIG. 22. For each day in the projection 2210, the processing device can then apply the corresponding transactions to the particular logical rule to determine how the logical rule may perform on that day. For example, the processing device can determine a performance metric value associated with a particular day by applying the transactions associated with that day to the particular logical rule. Examples of the performance metric can include a hit rate, a false positive rate, or a false negative rate. The processing device can repeat this process for some or all of the days in the projection 2210 to predict a performance trajectory for the particular logical rule over a future timespan.

In operation 2106, the processing device predicts a future date at which the particular logical rule will be ineffective based on the performance trajectory. For example, a logical rule may be considered ineffective if it has a performance metric value that is above or below a predefined threshold, depending on the circumstances (e.g., a low hit rate, a high false positive rate, or a high false negative rate). So, the processing device can determine a date in the future timespan at which the logical rule has such a performance metric value and select that date as the future date. If multiple dates have such a performance metric value, the processing device can select the date closest to the current date as the predicted future date.

In operation 2108, the processing device outputs the future date to a user. For example, the processing device can output the future date on a display device for a user, so that the user can configure the event detection system accordingly (e.g., by removing the particular rule from the event detection system on or after the future date). As still another example, the processing device can transmit an electronic communication that indicates the future date to a client device via a network. The client device can receive the electronic communication and output the future date to a user of the client device, so that the user can configure the event detection system accordingly.

In some examples, the processing device can automatically monitor the event detection system for outdated logical rules and remove or update them. For example, the event detection system can be configured to use the particular logical rule described above. At a later point in time, when the current date is subsequent to the date at which the particular logical rule becomes ineffective, the processing device can update the event detection system to remove the ineffective logical rule therefrom. The processing device can repeat this process for any number and combination of logical rules. This can help ensure that the event detection system has the most up-to-date and accurate logical rules, so that the event detection system is not needlessly expending computing resources on outdated or ineffective logical rules.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
   one or more processing devices; and
   one or more memory devices including instructions that are executable by the one or more processing devices for causing the one or more processing devices to:
   extract a plurality of logical rules from a plurality of trained decision trees, each logical rule in the plurality of logical rules corresponding to a pathway from a root node to a leaf node in a respective decision tree of the plurality of trained decision trees;
   apply a test data set to the plurality of logical rules to determine a plurality of count values by, for each item of test data in the test data set:
      determining at least two logical rules among the plurality of logical rules that are satisfied by the item of test data, the at least two logical rules being extracted from different decision trees of the plurality of trained decision trees;
      selecting a first logical rule from among the at least two logical rules;
      determining whether the first logical rule of the at least two logical rules yields a target result provided in the item of test data;
      adjusting a first count value corresponding the first logical rule depending on whether the first logical rule yields the target result; and
      adjusting a second count value corresponding to a second logical rule of the at least two logical rules depending on whether the first logical rule yields the target result, the second count value being different from the first count value;
   determine a plurality of performance metric values for the plurality of logical rules based on the plurality of count values;
   select a subset of logical rules from among the plurality of logical rules by comparing the plurality of performance metric values to a predefined threshold; and
   provide at least one logical rule in the subset of logical rules for use with an event detection system that is configured to detect an event in relation to a target data set that was not used to train the plurality of trained decision trees.

2. The system of claim 1, wherein the plurality of performance metric values is a second plurality of performance metric values, the predefined threshold is a second predefined threshold, and the one or more memory devices further include instructions that are executable by the one or more processing devices for causing the one or more processing devices to, prior to applying the test data set to the plurality of logical rules:
   extract a group of logical rules from the plurality of trained decision trees;
   determine a first plurality of performance metric values corresponding to the group of logical rules; and
   select the plurality of logical rules from among the group of logical rules by comparing the first plurality of performance metric values to a first predefined threshold.

3. The system of claim 2, wherein the first plurality of performance metric values are false positive rates or false negative rates.

4. The system of claim 1, wherein the one or more memory devices further include instructions that are executable by the one or more processing devices for causing the one or more processing devices to:
   determine that two logical rules in the plurality of logical rules are identical to one another by comparing text of the two logical rules to one another;
   select a particular logical rule of the two logical rules; and
   remove the particular logical rule from the plurality of logical rules.

5. The system of claim 1, wherein the one or more memory devices further include instructions that are executable by the one or more processing devices for causing the one or more processing devices to:
   generate a similarity matrix that includes similarity scores indicating how similar each logical rule in the subset of logical rules is to every other logical rule in the subset of logical rules;
   select a similarity score from the similarity matrix, the similarity score indicating how similar two logical rules are to one another;
   determine that the similarity score exceeds a predefined similarity threshold; and
   based on determining that the similarity score exceeds the predefined similarity threshold, apply a cleanup process to the two logical rules.

6. The system of claim 5, wherein the cleanup process is configured to remove duplicative rules from the subset of logical rules by:
   merging the two logical rules together into a single logical rule; or
   deleting one of the two logical rules from the subset of logical rules.

7. The system of claim 1, wherein the one or more memory devices further include instructions that are executable by the one or more processing devices for causing the one or more processing devices to:
   adjust the first count value corresponding to the first logical rule by:
      increasing a first count corresponding to the first logical rule in response to determining that the first logical rule yields the target result; or
      increasing a second count corresponding to the first logical rule in response to determining that the first logical rule does not yield the target result; and
   determine a respective performance metric for the first logical rule based on the first count and the second count.

8. The system of claim 1, wherein the one or more memory devices further include instructions that are executable by the one or more processing devices for causing the one or more processing devices to:
   generate the plurality of trained decision trees by training a plurality of decision trees using a training data set.

9. The system of claim 1, wherein the one or more memory devices further include instructions that are executable by the one or more processing devices for causing the one or more processing devices to:
   select the first logical rule from among the at least two logical rules using a randomized selection technique.

10. The system of claim 1, wherein the plurality of performance metric values are false positive rates, false negative rates, or hit rates.

11. The system of claim 1, wherein the one or more memory devices further include instructions that are executable by the one or more processing devices for causing the one or more processing devices to:
   automatically configure the event detection system to use the at least one logical rule in the subset of logical rules.

12. The system of claim 1, wherein the one or more memory devices further include instructions that are executable by the one or more processing devices for causing the one or more processing devices to:
- receive historical information describing transactions that occurred during a prior time period that spans from a first date that is not associated with the event to a second date that is associated with the event;
- based on the transactions in the historical information, determine a performance trajectory associated with a particular logical rule of the subset of logical rules;
- based on determining the performance trajectory, predict a future date at which the particular logical rule will be ineffective; and
- output the future date to a user of the event detection system.

13. The system of claim 1, wherein the one or more memory devices further include instructions that are executable by the one or more processing devices for causing the one or more processing devices to:
- generate a translated version of the at least one logical rule by replacing variables in the at least one logical rule with corresponding text that is mapped to the variables in a lookup table; and
- output the translated version of the at least one logical rule for display on a display device.

14. A method comprising:
- extracting, by one or more processing devices, a plurality of logical rules from a plurality of trained decision trees, each logical rule in the plurality of logical rules corresponding to a pathway from a root node to a leaf node in a respective decision tree of the plurality of trained decision trees;
- applying, by the one or more processing devices, a test data set to the plurality of logical rules to determine a plurality of count values by, for each item of test data in the test data set:
  - determining at least two logical rules among the plurality of logical rules that are satisfied by the item of test data, the at least two logical rules being extracted from different decision trees of the plurality of trained decision trees;
  - selecting a first logical rule from among the at least two logical rules;
  - determining whether the first logical rule of the at least two logical rules yields a target result provided in the item of test data; and
  - adjusting a first count value corresponding the first logical rule depending on whether the first logical rule yields the target result; and
  - adjusting a second count value corresponding to a second logical rule of the at least two logical rules depending on whether the first logical rule yields the target result, the second count value being different from the first count value;
- determining, by the one or more processing devices, a plurality of performance metric values for the plurality of logical rules based on the plurality of count values;
- selecting, by the one or more processing devices, a subset of logical rules from among the plurality of logical rules by comparing the plurality of performance metric values to a predefined threshold; and
- providing, by the one or more processing devices, at least one logical rule in the subset of logical rules for use with an event detection system that is configured to detect an event in relation to a target data set that was not used to train the plurality of trained decision trees.

15. The method of claim 14, wherein the plurality of performance metric values is a second plurality of performance metric values, the predefined threshold is a second predefined threshold, and further comprising, prior to applying the test data set to the plurality of logical rules:
- extracting a group of logical rules from the plurality of trained decision trees;
- determining a first plurality of performance metric values corresponding to the group of logical rules; and
- selecting the plurality of logical rules from among the group of logical rules by comparing the first plurality of performance metric values to a first predefined threshold.

16. The method of claim 15, wherein the first plurality of performance metric values are false positive rates or false negative rates.

17. The method of claim 14, further comprising:
- determining that two logical rules in the plurality of logical rules are identical to one another by comparing text of the two logical rules to one another;
- selecting a particular logical rule of the two logical rules; and
- removing the particular logical rule from the plurality of logical rules.

18. The method of claim 14, further comprising:
- generating a similarity matrix that includes similarity scores indicating how similar each logical rule in the subset of logical rules is to every other logical rule in the subset of logical rules;
- selecting a similarity score from the similarity matrix, the similarity score indicating how similar two logical rules are to one another;
- determining that the similarity score exceeds a predefined similarity threshold; and
- based on determining that the similarity score exceeds the predefined similarity threshold, applying a cleanup process to the two logical rules.

19. The method of claim 18, wherein the cleanup process is configured to remove duplicative rules from the subset of logical rules by:
- merging the two logical rules together into a single logical rule; or
- deleting one of the two logical rules from the subset of logical rules.

20. The method of claim 14, further comprising:
- adjusting the first count value corresponding to the first logical rule by:
  - increasing a first count corresponding to the first logical rule in response to determining that the first logical rule yields the target result; or
  - increasing a second count corresponding to the first logical rule in response to determining that the first logical rule does not yield the target result; and
- determining a respective performance metric for the first logical rule based on the first count and the second count.

21. The method of claim 14, further comprising:
- generating the plurality of trained decision trees by training a plurality of decision trees using a training data set.

22. The method of claim 14, further comprising:
- selecting the first logical rule from among the at least two logical rules using a randomized selection technique.

23. The method of claim 14, wherein the plurality of performance metric values are false positive rates, false negative rates, or hit rates.

24. The method of claim 14, further comprising:
- automatically configuring the event detection system to use the at least one logical rule in the subset of logical rules.

25. The method of claim 14, further comprising:
receiving historical information describing transactions that occurred during a prior time period that spans from a first date that is not associated with the event to a second date that is associated with the event;
based on the transactions in the historical information, determining a performance trajectory associated with a particular logical rule of the subset of logical rules;
based on determining the performance trajectory, predicting a future date at which the particular logical rule will be ineffective; and
outputting the future date to a user of the event detection system.

26. The method of claim 14, further comprising:
generating a translated version of the at least one logical rule by replacing variables in the at least one logical rule with corresponding text that is mapped to the variables in a lookup table; and
outputting the translated version of the at least one logical rule for display on a display device.

27. A non-transitory computer-readable medium comprising program code that is executable by one or more processing devices for causing the one or more processing devices to:
extract a plurality of logical rules from a plurality of trained decision trees, each logical rule in the plurality of logical rules corresponding to a pathway from a root node to a leaf node in a respective decision tree of the plurality of trained decision trees;
apply a test data set to the plurality of logical rules to determine a plurality of count values by, for each item of test data in the test data set:
determining at least two logical rules among the plurality of logical rules that are satisfied by the item of test data, the at least two logical rules being extracted from different decision trees of the plurality of trained decision trees;
selecting a first logical rule from among the at least two logical rules;
determining whether the first logical rule of the at least two logical rules yields a target result provided in the item of test data; and
adjusting a first count value corresponding the first logical rule depending on whether the first logical rule yields the target result; and
adjusting a second count value corresponding to a second logical rule of the at least two logical rules depending on whether the first logical rule yields the target result, the second count value being different from the first count value;
determine a plurality of performance metric values for the plurality of logical rules based on the plurality of count values;
select a subset of logical rules from among the plurality of logical rules by comparing the plurality of performance metric values to a predefined threshold; and
provide at least one logical rule in the subset of logical rules for use with an event detection system that is configured to detect an event in relation to a target data set that was not used to train the plurality of trained decision trees.

28. The non-transitory computer-readable medium of claim 27, further comprising program code that is executable by the one or more processing devices for causing the one or more processing devices to:
generate a similarity matrix that includes similarity scores indicating how similar each logical rule in the subset of logical rules is to every other logical rule in the subset of logical rules;
select a similarity score from the similarity matrix, the similarity score indicating how similar two logical rules are to one another;
determine that the similarity score exceeds a predefined similarity threshold; and
based on determining that the similarity score exceeds the predefined similarity threshold, apply a cleanup process to the two logical rules.

29. The non-transitory computer-readable medium of claim 27, further comprising program code that is executable by the one or more processing devices for causing the one or more processing devices to:
adjust the first count value corresponding to the first logical rule by:
increasing a first count corresponding to the first logical rule in response to determining that the first logical rule yields the target result; or
increasing a second count corresponding to the first logical rule in response to determining that the first logical rule does not yield the target result; and
determine a respective performance metric for the first logical rule based on the first count and the second count.

30. The non-transitory computer-readable medium of claim 27, further comprising program code that is executable by the one or more processing devices for causing the one or more processing devices to:
receive historical information describing transactions that occurred during a prior time period that spans from a first date that is not associated with the event to a second date that is associated with the event;
based on the transactions in the historical information, determine a performance trajectory associated with a particular logical rule of the subset of logical rules;
based on determining the performance trajectory, predict a future date at which the particular logical rule will be ineffective; and
output the future date to a user of the event detection system.

* * * * *